(12) United States Patent
Jacquemoud-Collet et al.

(10) Patent No.: US 10,994,862 B2
(45) Date of Patent: May 4, 2021

(54) MODULAR ELEMENT FOR AN ELECTRICAL POWER DISTRIBUTION NETWORK OF AN AIRCRAFT

(71) Applicant: Airbus Operations SAS, Toulouse (FR)

(72) Inventors: Jonathan Jacquemoud-Collet, Toulouse (FR); Philippe Chapoulie, Brax (FR); Gilles Millet, Lezat sur Leze (FR); Philippe Pedoussaut, Mauzac (FR); Damien Aguera, Tournefeuille (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 189 days.

(21) Appl. No.: 16/050,758

(22) Filed: Jul. 31, 2018

(65) Prior Publication Data
US 2019/0039716 A1    Feb. 7, 2019

(30) Foreign Application Priority Data

Aug. 2, 2017 (FR) ........................................ 1757395
Nov. 6, 2017 (FR) ........................................ 1760372

(51) Int. Cl.
| | |
|---|---|
| B64D 41/00 | (2006.01) |
| B64C 1/16 | (2006.01) |
| B64D 27/26 | (2006.01) |
| H02J 13/00 | (2006.01) |
| H02J 3/38 | (2006.01) |

(Continued)

(52) U.S. Cl.
CPC ............... *B64D 41/00* (2013.01); *B64C 1/16* (2013.01); *B64C 1/20* (2013.01); *B64D 11/003* (2013.01); *B64D 27/24* (2013.01); *B64D 27/26* (2013.01); *H02J 13/0003* (2013.01);
(Continued)

(58) Field of Classification Search
None
See application file for complete search history.

(56) References Cited

U.S. PATENT DOCUMENTS

| | | |
|---|---|---|
| 5,594,285 A | 1/1997 | Wisbey et al. |
| 6,536,710 B1 | 3/2003 | Bobzien et al. |

(Continued)

FOREIGN PATENT DOCUMENTS

WO    2012084205    6/2012

OTHER PUBLICATIONS

French Search Report, dated Apr. 19, 2018, priority document.

*Primary Examiner* — Jared Fureman
*Assistant Examiner* — Joel Barnett
(74) *Attorney, Agent, or Firm* — Greer, Burns & Crain, Ltd.

(57) ABSTRACT

A modular element for an electrical power distribution network of an aircraft comprises a section of a bus comprising connection points at different locations distributed along its length. The bus section comprises interconnection points making it possible to link the modular element to other modular elements arranged longitudinally in series with the modular element. Electrical conductors of the bus section are housed in an enclosure corresponding to a structural part of the aircraft. This enclosure comprises openings facing the connection points of the bus section, so as to allow the connection of at least one electrical equipment item of the aircraft to the bus section by means of a local electrical link.

9 Claims, 16 Drawing Sheets

(51) Int. Cl.
  *B64D 27/24* (2006.01)
  *B64C 1/20* (2006.01)
  *B64D 11/00* (2006.01)
  *H02J 4/00* (2006.01)
(52) U.S. Cl.
  CPC ........... *B64D 2221/00* (2013.01); *H02J 3/381* (2013.01); *H02J 4/00* (2013.01)

(56) References Cited

U.S. PATENT DOCUMENTS

| | | | |
|---|---|---|---|
| 9,678,488 B1 * | 6/2017 | Dhondt | G05B 23/0256 |
| 2007/0018045 A1 * | 1/2007 | Callahan | B64C 1/20 244/118.6 |
| 2013/0277901 A1 | 10/2013 | Moje et al. | |
| 2014/0184097 A1 * | 7/2014 | Luk | H05B 47/18 315/297 |
| 2016/0380440 A1 | 12/2016 | Coleman et al. | |
| 2017/0318649 A1 * | 11/2017 | Hall | H05B 47/11 |
| 2018/0229847 A1 * | 8/2018 | Smallhorn | H01R 25/006 |

* cited by examiner

MODULAR ELEMENT FOR AN ELECTRICAL POWER DISTRIBUTION NETWORK OF AN AIRCRAFT

CROSS-REFERENCES TO RELATED APPLICATIONS

This application claims the benefit of the French patent application No. 1757395 filed on Aug. 2, 2017, and of the French patent application No. 1760372 filed on Nov. 6, 2017, the entire disclosures of which are incorporated herein by way of reference.

BACKGROUND OF THE INVENTION

The present invention relates to the field of the electrical powering of equipment items of an aircraft. The aircraft, in particular transport aircraft, comprise electrical equipment items distributed, in particular, in their fuselage. These electrical equipment items have to be powered electrically and, for some of them, have to be linked to a data communication network. For that, the aircraft include harnesses of electrical power cables and of data communication cables. The electrical power cable harnesses generally extend between an electrical core of the aircraft (notably allowing the arrival of electrical power from electrical power generation and/or conversion sources) and the electrical equipment items to be powered. The communication cable harnesses generally extend between communication equipment items of the aircraft, for example, a switch conforming to the ARINC 664 standard part 7, and the electrical equipment items linked to these communication equipment items.

In modern aircraft, more and more functions are implemented electrically. These functions sometimes require more varied electrical voltages than in the older generations of aircraft (for example 28 VDC, 115 VAC, 230 VAC, 270 VDC, 540 VDC, etc.), and numerous data communication links between different equipment items of the aircraft. The result thereof is that the harnesses are increasingly complex, more voluminous and heavier than in the older generations of aircraft. The implementation of the harnesses is also more complex. Consequently, it would be desirable to simplify the electrical energy distribution and the data links of the electrical equipment items of the aircraft.

The different harnesses are specific to each type of aircraft and are also a function of a configuration of the aircraft specific to the airline operating this aircraft. For example, depending on whether certain electrical equipment items are installed or are not installed in the fuselage, the harnesses include or do not include cables allowing the electrical powering and data links of these equipment items. The result thereof is that the list of the electrical equipment items that have to be installed in a particular aircraft must be defined and fixed sufficiently early before the production of the aircraft so as to be able to design, produce and install in time the harnesses specific to that aircraft. This list must be defined all the earlier since the aircraft are generally produced by assembling fuselage sections in which are preinstalled harness sections which are connected to one another after the assembly of the fuselage sections. Now, it would be desirable to be able to modify the list of the electrical equipment items that have to be installed in the aircraft up to a more advanced stage in the production of the aircraft.

Also, since the harnesses are produced specifically according to the list of the electrical equipment items installed in the aircraft, as well as of the positions in the fuselage of the equipment items, modifying the configuration of the aircraft after its delivery to an airline is difficult. Now, such modification may be necessary, for example upon a resale of the aircraft to another airline or if the airline wants to add new electrical equipment items in the aircraft. Consequently, it would be desirable to be able to more easily modify the list and the positions of the electrical equipment items of an aircraft.

SUMMARY OF THE INVENTION

An aim of the present invention is, in particular, to provide a solution, at least partially, to these problems.

According to a first aspect of the invention, the invention relates to an aircraft comprising:
a fuselage;
a set of electrical generators, comprising at least a first electrical generator and a second electrical generator;
a set of electrical equipment items, distributed in the fuselage; and
an electrical power distribution network comprising:
a set of buses, comprising at least a first bus and a second bus; and
a switching system.
This aircraft is noteworthy in that:
each bus of the set of buses extends, at least partly, in a longitudinal direction of the fuselage;
the first bus and the second bus follow segregated paths in the fuselage;
the switching system is linked electrically to the first electrical generator and to the second electrical generator, and to the first bus and to the second bus;
the switching system comprises a so-called normal mode of operation, in which it is configured to electrically link the first electrical generator to the first bus and the second electrical generator to the second bus;
each bus of the set of buses comprises connection points at different locations distributed along its length; and
each of the electrical equipment items of the set of electrical equipment items is linked to a connection point of a bus of the set of buses, via a local electrical power supply link.

The set of buses corresponds to an invariant infrastructure of the electrical power distribution network of the aircraft. The different electrical equipment items are each linked to a connection point of a bus by a local electrical power supply link. It is thus possible to easily add a new electrical equipment item in the fuselage, without modifying this infrastructure: it is sufficient for that to install a local electrical power supply link between this new equipment item and a connection point of a bus. Preferably, this connection point is chosen to be as close as possible, on the bus concerned, to the new electrical equipment item, in order, in particular, to facilitate the installation of the local electrical power supply link between the electrical equipment item and the bus. This addition of a new electrical equipment item can be provided equally during the production of the aircraft, and upon a modification of the configuration of the aircraft after its delivery to an airline. It is also easy to move an electrical equipment item in the fuselage of the aircraft, for example upon a modification of the configuration of the aircraft: for that, it is sufficient to remove its original local electrical power supply link, to move the electrical equipment item to its new position in the fuselage and to install a new local electrical power supply link to another connection point of a bus. The use of a set of buses rather than cable harnesses also makes it possible to reduce the weight and the cost of the electrical power distribution network of the aircraft. Indeed, the electrical conductors of a bus used in common by several electrical equipment items require a lesser dimensioning than the sum of the dimensionings of separate cables, in harnesses, powering these same electrical equipment items. Given that the first bus and the second bus follow segregated paths in the fuselage, in the normal mode of operation these two buses are completely independent of one another and they do not risk being exposed to a failure or to damage in common (for example in case of an engine explosion . . . ). Thus, the electrical powering of the electrical equipment items linked to a bus is totally independent of the other bus. Consequently, in case of failure affecting one of the buses, only electrical equipment items linked to connection points of this bus risk being deprived of electrical power supply. The electrical equipment items linked to the other bus then continue to be powered normally since their electrical power supply is totally independent of the bus affected by the failure.

According to different embodiments that can be implemented in isolation or combined with one another:
- the first bus extends also partly in a first wing of the aircraft and the second bus extends also partly in a second wing of the aircraft;
- the first electrical generator and the second electrical generator are linked electrically to the switching system via buses. Advantageously, the first electrical generator is linked electrically to the switching system via dedicated conductors of the first bus and the second electrical generator is linked electrically to the switching system via dedicated conductors of the second bus;
- the electrical power distribution network further comprises a third bus and a fourth bus which extend, at least partly, in a longitudinal direction of the fuselage, the first, second, third and fourth buses following segregated paths in the fuselage of the aircraft. Advantageously, the set of electrical generators further comprises a third electrical generator and a fourth electrical generator and, in the normal mode of operation, the switching system is configured to electrically link the third electrical generator to the third bus and the fourth electrical generator to the fourth bus;
- the switching system comprises a so-called reconfigured mode of operation, that can be activated in case of the occurrence of a failure in the electrical power distribution network, in which it is configured to:
- establish electrical links between the electrical generators of the set of electrical generators and the buses of the set of buses, these electrical links being modified compared to the electrical links established in the normal mode of operation; and/or
- establish electrical links between buses of the set of buses;
- the switching system comprises a main switching device and at least one secondary switching device remote from the main switching device. Advantageously, in the reconfigured mode of operation of the switching system, the at least one secondary switching device is capable of being controlled to establish one or more electrical links between buses of the set of buses;
- at least one of the buses of the set of buses comprises at least two modular sections arranged end-to-end and linked electrically to one another. Advantageously, a secondary switching device is linked electrically to two consecutive modular sections of a bus, so as to establish electrical links between similar electrical conductors of the two modular sections in the normal mode of operation and establish electrical links between, on the one hand, electrical conductors of at least one of the two modular sections and, on the other hand, electrical conductors of another bus, in the reconfigured mode of operation.

According to a second aspect of the invention, the invention relates to a modular element for a hybrid electrical power distribution and data communication network of an aircraft. This modular element is noteworthy in that it comprises:
- a section of an electrical power distribution bus, extending along a length of the modular element; and
- a set of data links, this set of data links extending along the length of the modular element, substantially parallel to the bus section, and in that:
- the bus section comprises connection points at different locations distributed along its length;
- the set of data links comprises connection points at different locations distributed along its length and each arranged in proximity to a connection point of the bus section;
- the set of data links comprises a connection point, called cross-connect point, provided to receive a cross-connect rack;
- the set of data links comprises at least one data link between, on the one hand, each of the connection points distributed along its length and, on the other hand, the cross-connect point;
- the bus section and the set of data links each comprise a first interconnection point provided to link the bus section and the set of data links respectively to a bus section and to a set of data links of a first other modular element arranged longitudinally in series with the modular element, at a first longitudinal end of the modular element; and
- the bus section and the set of data links each comprise a second interconnection point provided to link the bus section and the set of data links respectively to a bus section and to a set of data links of a second other modular element arranged longitudinally in series with the modular element, at a second longitudinal end of the modular element opposite the first longitudinal end.

The assembly of modular elements according to the invention makes it possible to construct a hybrid electrical power distribution and data communication network of an aircraft. With respect to the electrical power distribution, this network offers the same advantages as those described with reference to the first aspect of the invention. This network also offers similar advantages with respect to data communication. The use of modular elements according to the invention to construct the network makes it possible to easily adapt this network to any type of aircraft, without requiring buses or sets of data links specific to the aircraft concerned, particularly with respect to their length. The use of one or more types of modular elements of predetermined lengths makes it possible to adapt such a network to any aircraft, and also to pool and minimize the development costs.

According to different embodiments that can be implemented in isolation or combined with one another:
- the data links correspond to optical fibers;
- the cross-connect point comprises a subset of data links terminated by at least one connector, called cross-connect connector, provided to be incorporated in the cross-connect rack. Advantageously, the cross-connect point further comprises at least one fixing provided to allow the fixing of the cross-connect rack to the modular element. Also advantageously:

the cross-connect point on the one hand and the first interconnection point of the set of data links on the other hand are situated in proximity to the first longitudinal end of the modular element;

the first interconnection point of the set of data links comprises a subset of data links terminated by at least one connector, called first interconnection connector; and the arrangement of the cross-connect point and of the first interconnection point is provided to allow the incorporation of the cross-connect connector and of the first interconnection connector in the cross-connect rack, so as to make it possible to link the set of data links to the set of data links of the first other modular element, in the cross-connect rack;

the modular element is such that:

the connection points distributed along the bus section and the connection points distributed along the set of data links, each arranged in proximity to a connection point of the bus section, form pairs of connection points distributed along the modular element; and each pair of connection points is provided to receive a hybrid electrical power distribution and data communication junction box configured to allow the connection of one or more local electrical power distribution and/or data distribution links to one or more electrical equipment items of the aircraft;

the bus section comprises at least one flexible part provided to allow deformations of the modular element in response to deformations of a fuselage of an aircraft when the modular element is installed in the fuselage of an aircraft.

The invention also relates to an aircraft comprising a fuselage and a set of electrical equipment items distributed in the fuselage. This aircraft is noteworthy in that:

the aircraft comprises a hybrid electrical power distribution and data communication network comprising a set of modular elements as mentioned above; and each of the electrical equipment items of the set of electrical equipment items is linked to a connection point of the bus section of a modular element via a local electrical power supply link and/or to a connection point of the set of data links of the modular element by a local data link.

In a particular embodiment:

modular elements of a first subset of the set of modular elements are assembled together so as to form a first hybrid electrical power distribution and data communication subnetwork extending, at least partly, longitudinally in the fuselage of the aircraft;

modular elements of a second subset of the set of modular elements are assembled together so as to form a second hybrid electrical power distribution and data communication subnetwork extending, at least partly, longitudinally in the fuselage of the aircraft; and the first subnetwork and the second subnetwork follow segregated paths in the fuselage.

In another particular embodiment that can be combined with the preceding one, two consecutive modular elements are linked to one another electrically by means:

of at least one flexible connection; or of at least one connection element configured to slide over the section of a bus of at least one of the two modular elements.

In yet another particular embodiment that can be combined with the preceding ones, the cross-connect rack of a modular element receives:

an interconnection connector of the first other modular element; and a set of links between the first interconnection connector of the modular element and the interconnection connector of the first other modular element.

According to a third aspect of the invention, the invention relates to an aircraft comprising:

a fuselage;

a set of electrical equipment items, distributed in the fuselage; and a hybrid electrical power distribution and data communication network.

This aircraft is noteworthy in that:

the hybrid electrical power distribution and data communication network comprises:

a set of buses, comprising at least one electrical power distribution bus; and at least one set of data links, the hybrid electrical power distribution and data communication network is configured in such a way that a set of data links is associated with each bus of the set of buses;

each bus of the set of buses extends, at least partly, in a longitudinal direction of the fuselage;

each set of data links extends substantially parallel to the bus with which it is associated;

each bus of the set of buses comprises connection points at different locations distributed along its length; and each set of data links comprises connection points at different locations distributed along its length and each arranged in proximity to a connection point of the bus with which the set of data links is associated, so as to form pairs of connection points each comprising a connection point of the bus and a connection point of the associated set of data links; and each of the electrical equipment items of the set of electrical equipment items is linked to a pair of connection points via a local electrical power supply link and/or via a local data link.

As for the first aspect of the invention, the set of buses corresponds to an invariant infrastructure of the electrical power distribution network of the aircraft. It offers the same advantages as those described with reference to the first aspect of the invention. The at least one set of data links corresponds to an invariant infrastructure of the data communication network. The electrical equipment items which require a data communication link are each linked to a connection point of the set of data links by a local data link. That offers advantages similar to those of the electrical power distribution network with respect to the addition or the moving of electrical equipment items. When an equipment item requires both an electrical power supply and a data link, the fact that each connection point of the set of data links is situated in proximity to a connection point of the bus with which the set of data links is associated, makes it possible to facilitate the connection of the equipment item to the infrastructure of the electrical power distribution network and to the infrastructure of the data communication network: the local electrical power supply link and the local data link can thus run together between the electrical equipment item and the connection points.

In one embodiment, the hybrid electrical power distribution and data communication network comprises a set of junction boxes, each junction box being connected to a pair of connection points. Advantageously, a junction box of the set of junction boxes comprises:

at least one electrical power supply connector configured to cooperate with the connection point of the bus belonging to the pair of connection points to which the junction box is connected;

at least one data link connector configured to cooperate with the connection point of the set of data links belonging to the pair of connection points to which the junction box is connected; and a set of locations provided to receive interface modules;

a set of electrical links extending between the electrical power supply connector and the different locations provided to receive the interface modules; and a set of data links extending between the data link connector and the different locations provided to receive the interface modules.

Also advantageously, the aircraft comprises:

at least one electrical interface module in a location of the junction box and/or at least one data link interface module in a location of the junction box; and at least one local electrical power supply link between the at least one electrical interface module and an electrical equipment item of the aircraft and/or at least one local data link between the at least one data link interface module and an electrical equipment item of the aircraft.

The electrical interface module is for example chosen from the following set:

an electrical connection module;

an electrical switching module;

an electrical voltage conversion module; and an electrical protection module.

The data link interface module is, for example, chosen from the following set:

a data link connection module;

a data link conversion module;

a wireless data link module; and a data acquisition and concentration module.

Advantageously, the aircraft comprises, in a location of the junction box, a hybrid interface module ensuring an electrical interface module function and a data link interface module function.

Also advantageously, the aircraft is such that:

the data links of the set of data links associated with the bus correspond to optical fibers;

the set of data links extending between the data link connector and the different locations provided to receive the interface modules comprises:

a data link converter;

data links by optical fibers, between the data link connector and the data link converter;

data links using electrical signals, between the data link converter and the different locations provided to receive the interface modules.

In a particular embodiment that can be combined with the preceding ones:

at least one bus of the set of buses comprises at least two modular sections arranged end-to-end and linked electrically to one another;

each of the at least two modular sections of the at least one bus forms part of a modular element also comprising a set of data links extending substantially parallel to the modular section concerned; and the sets of data links of consecutive modular elements are linked to one another so as to form the set of data links associated with the bus concerned.

According to a fourth aspect of the invention, the invention relates to a modular element for an electrical power distribution network of an aircraft.

This modular element is noteworthy in that it comprises a section of an electrical power distribution bus, extending along a length of the modular element, and in that:

the bus section comprises connection points at different locations distributed along its length;

the bus section comprises a first interconnection point provided to link the bus section to a bus section of a first other modular element arranged longitudinally in series with the modular element, at a first longitudinal end of the modular element;

the bus section comprises a second interconnection point provided to link the bus section to a bus section of a second other modular element arranged longitudinally in series with the modular element, at a second longitudinal end of the modular element opposite the first longitudinal end;

the bus section comprising a set of electrical conductors, these electrical conductors of the bus section are housed in an enclosure corresponding to a structural part of the aircraft; and the enclosure comprises openings facing the connection points of the bus section, so as to allow the connection of at least one electrical equipment item of the aircraft to the bus section by means of a local electrical link.

The assembly of modular elements according to the invention makes it possible to construct an electrical power distribution network of an aircraft. With respect to the electrical power distribution, this network offers the same advantages as those described with reference to the first and second aspects of the invention. The modular elements according to the invention comprise an enclosure corresponding to a structural part of the aircraft, that is to say, a part participating in the mechanical structure of the aircraft, the result thereof is a saving in weight of the aircraft. Indeed, these modular elements do not require a specific enclosure to protect and insulate their electrical conductors.

According to different embodiments that can be implemented in isolation or combined with one another:

the structural part of the aircraft is provided to cooperate with a fixing of at least one baggage compartment of the aircraft to support this baggage compartment;

the structural part of the aircraft corresponds to a floor rail section of the aircraft;

at least one of the first and second interconnection points comprises a connector provided to slidingly absorb relative movements between, on the one hand, the modular element and, on the other hand, respectively, the first or the second other modular element;

the modular element is provided for a hybrid electrical power distribution and data communication network of an aircraft and it comprises a set of data links, this set of data links extending along the length of the modular element, substantially parallel to the bus section. The modular element is such that:

the set of data links comprises connection points at different locations distributed along its length and each arranged in proximity to a connection point of the bus section;

the set of data links comprises a connection point, called cross-connect point, provided to receive a cross-connect rack;

the set of data links comprises at least one data link between, on the one hand, each of the connection points distributed along its length and, on the other hand, the cross-connect point;

the set of data links comprises a first interconnection point provided to link the set of data links to a set of data links of a first other modular element arranged longitudinally in series with the modular element, at a first longitudinal end of the modular element; and the set of data links comprises a second interconnection point provided to link the set of data links to a set of data links of a second other modular element arranged longitudinally in series with the modular element, at a second longitudinal end of the modular element opposite the first longitudinal end.

The invention also relates to an aircraft comprising a fuselage and a set of electrical equipment items distributed in the fuselage.

This aircraft is noteworthy in that:

the aircraft comprises an electrical power distribution network comprising a set of modular elements as mentioned above; and each of the electrical equipment items of the set of electrical equipment items is linked to a connection point of the bus section of a modular element via a local electrical power supply link.

In a particular embodiment:

modular elements of a first subset of the set of modular elements are assembled together so as to form a first electrical power distribution subnetwork extending, at least partly, longitudinally in the fuselage of the aircraft;

modular elements of a second subset of the set of modular elements are assembled together so as to form a second electrical power distribution subnetwork extending, at least partly, longitudinally in the fuselage of the aircraft; and the first subnetwork and the second subnetwork follow segregated paths in the fuselage.

In another particular embodiment that can be combined with the preceding one:

two consecutive modular elements are linked to one another electrically by means of at least one connection element configured to slide over the section of a bus of at least one of the two modular elements.

In other particular embodiments that can be combined with the preceding ones:

the aircraft comprises a set of baggage compartments fixed to modular elements of the set of modular elements;

the aircraft comprises a floor comprising a rail of which at least a part is formed by a set of modular elements.

BRIEF DESCRIPTION OF THE DRAWINGS

The invention will be better understood on reading the following description and on studying the attached figures.

FIG. 21b represents an example of junction box seen by a cross-sectional view taken along the line IIIa-IIIa of FIG. 21a;

DETAILED DESCRIPTION OF THE PREFERRED EMBODIMENTS

Figure 1:
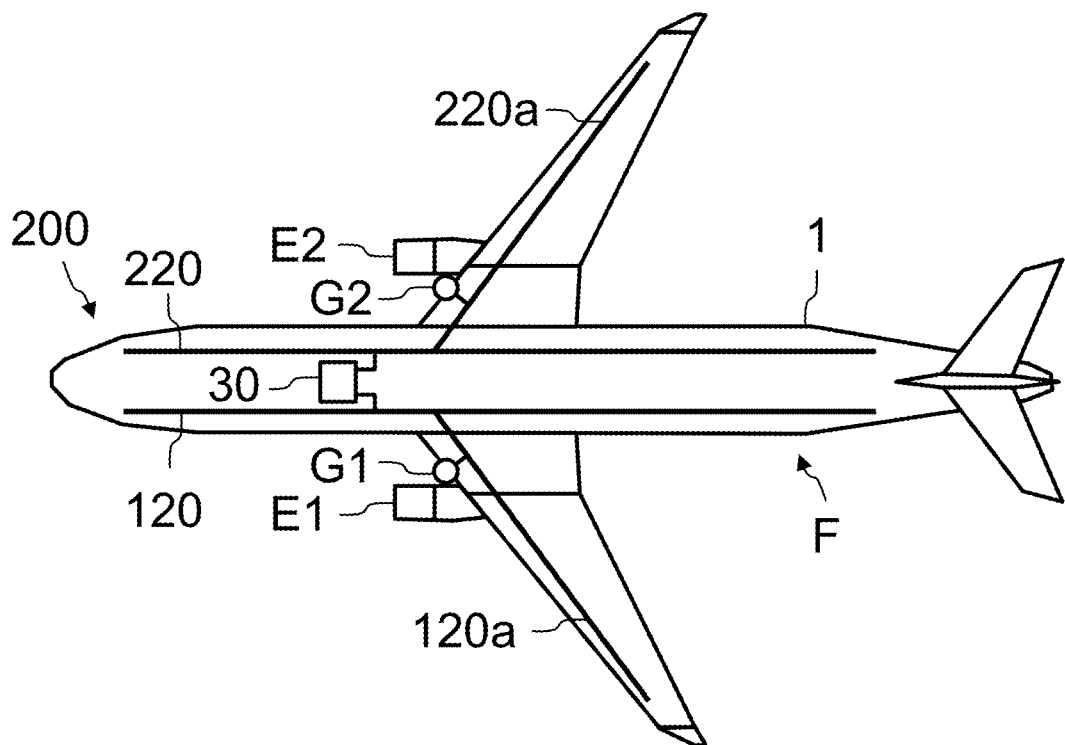
FIG. 1 schematically represents an aircraft comprising an electrical power distribution network, according to an embodiment of the invention.
Figure 5:
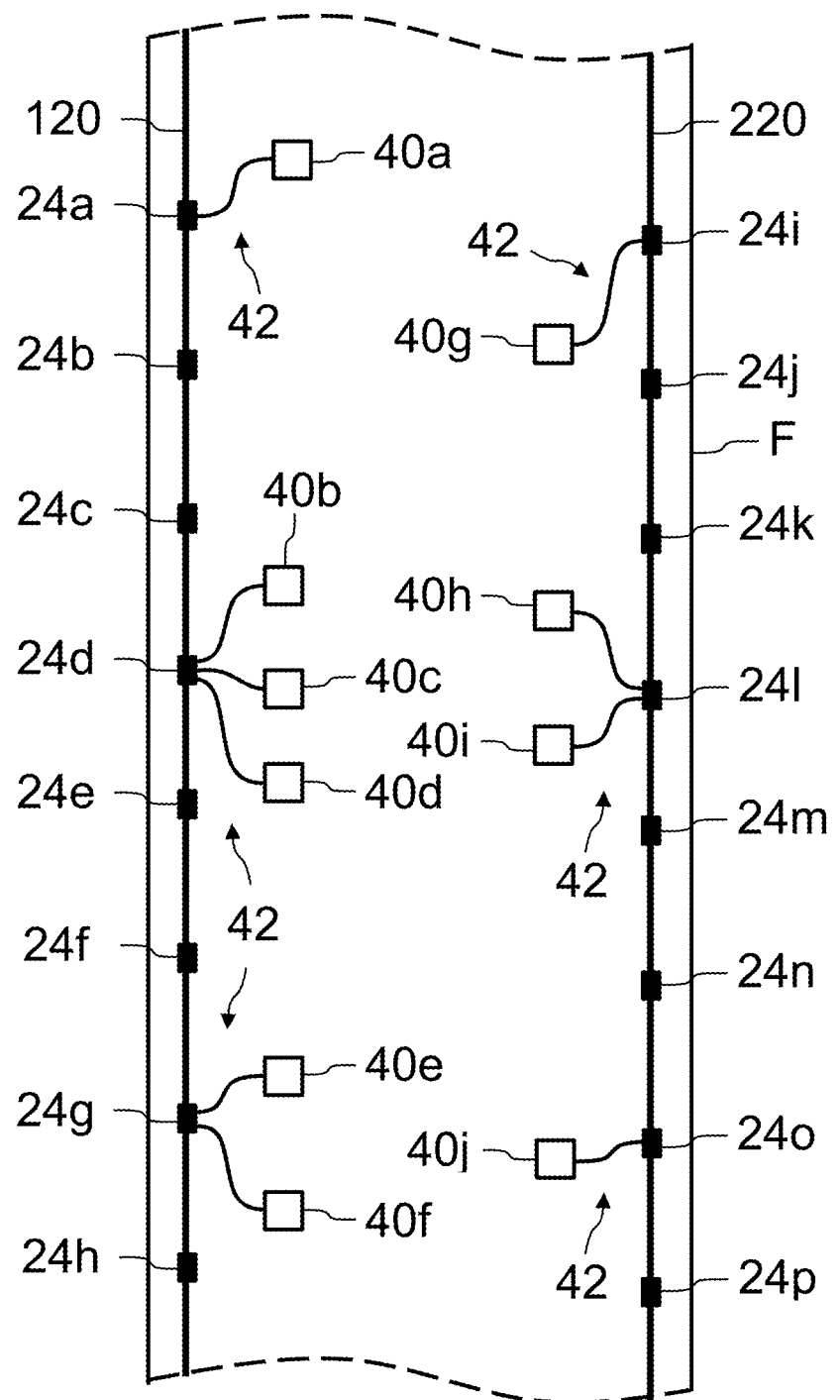
FIG. 5 is a schematic view of a part of the fuselage of the aircraft represented in FIG. 1.

According to an embodiment in accordance with the first aspect of the invention, the aircraft 1 represented in FIG. 1 comprises a fuselage F and a set of electrical generators comprising a first generator G1 associated with an engine E1 of the aircraft and a second generator G2 associated with an engine E2 of the aircraft. The aircraft 1 also comprises an electrical power distribution network 200. The electrical power distribution network comprises a set of buses, including a first bus 120, 120a and a second bus 220, 220a. Each of the two buses comprises at least one part 120, respectively 220, extending in a longitudinal direction of the fuselage F. These two buses follow segregated paths in the fuselage F of the aircraft, respectively in a left-hand (or port) part of the fuselage for the part 120 of the first bus and in a right-hand (or starboard) part of the fuselage for the part 220 of the second bus. This makes it possible to avoid a common failure on the two buses in the case of an incident in a part of the fuselage. Advantageously, the first bus comprises a part 120a in a left wing of the aircraft and the second bus comprises a part 220*a* in a right wing of the aircraft Similar conductors of the part 120*a* and of the part 120 are linked electrically to one another. Likewise, similar conductors of the part 220*a* and of the part 220 are linked electrically to one another. The electrical power distribution network 200 also comprises a switching system 30. This switching system is linked electrically to the first electrical generator G1 and to the second electrical generator G2, and to the first bus 120, 120*a* and to the second bus 220, 220*a*. The switching system 30 comprises a so-called normal mode of operation, in which it is configured to electrically link the first electrical generator G1 to the first bus 120, 120*a* and the second electrical generator G2 to the second bus 220, 220*a*. In a particular embodiment, the first electrical generator G1 is linked electrically to the switching system 30 via dedicated conductors (or bars) of the first bus 120, 120*a* and the second electrical generator G2 is linked electrically to the switching system via dedicated conductors of the second bus 220, 220*a*. For example, the first generator G1 situated in the left wing of the aircraft, in proximity to the engine E1, is linked to dedicated conductors of the part 120*a* of the first bus, by a local electrical power supply link between this generator and this part 120*a* of the first bus. Likewise, the second generator G2 situated in the right wing of the aircraft, in proximity to the engine E2, is linked to dedicated conductors of the part 220*a* of the second bus, by a local electrical power supply link between this generator and this part 220*a* of the second bus. That makes it possible to avoid running specific wirings in the wings and in the fuselage of the aircraft. The aircraft 1 also comprises a set of electrical equipment items distributed in the fuselage and each bus of the set of buses comprises connection points at different locations distributed along its length. For the purposes of clarity of the figure, these electrical equipment items and these connection points are not represented in FIG. 1, but in FIG. 5 illustrating a part of the fuselage F. Thus, the aircraft 1 comprises a set of electrical equipment items 40*a* . . . 40*j* in the part of the fuselage represented in FIG. 5. These electrical equipment items each require an electrical power supply to operate. The first bus 120 comprises connection points 24*a* . . . 24*h* at different locations distributed along its length, in its part represented in the figure. The second bus 220 comprises connection points 24*i* . . . 24*p* at different locations distributed along its length, in its part represented in the figure. Each of the electrical equipment items of the set of electrical equipment items is linked to a connection point of a bus of the set of buses, via a local electrical power supply link 42. Thus, for example, the electrical equipment item 40*a* is linked to the connection point 24*a* of the first bus 120. The electrical equipment items 40*b*, 40*c* and 40*d* are linked to the connection point 24*d*. The electrical equipment items 40*e* and 40*f* are linked to the connection point 24*g*. The electrical equipment item 40*g* is linked to the connection point 24*i* of the second bus 220. The electrical equipment items 40*h* and 40*i* are linked to the connection point 24*l*. The electrical equipment item 40*j* is linked to the connection point 24*o*. Advantageously, the connection points 24*a*, 24*d*, 24*g*, 24*i*, 24*l* and 24*o* receiving local electrical power supply links 42 of electrical equipment items are equipped with junction boxes provided with taps or connectors making it possible to easily connect these local electrical power supply links 42. Also advantageously, the other connection points not receiving local electrical power supply links are not equipped with such junction boxes in order to limit the weight of the aircraft. In a particular exemplary embodiment, two consecutive connection points of a bus are spaced apart by a distance of approximately 50 to 70 cm. This distance corresponds, for example, to the distance between two structural frames of the aircraft. The junction boxes can, for example, be installed every four or five connection points in most of the fuselage. However, in zones of the fuselage corresponding to a particularly high density of electrical equipment items, all the connection points, or sometimes one connection point in every two, can be equipped with junction boxes.

The set of buses forms an infrastructure of the electrical power distribution network 200 of the aircraft. The different electrical equipment items 40*a* . . . 40*i* are each linked to a connection point of a bus by a local electrical power supply link 42. It is thus possible to easily add a new electrical equipment item in the fuselage, without modifying this infrastructure: it is sufficient for that to put in place a local electrical power supply link between this new equipment item and a connection point of a bus. Preferably, this connection point is chosen to be as close as possible, on the bus concerned, to the new electrical equipment item. This addition of a new electrical equipment item can be made equally during the construction of the aircraft and during a modification of the configuration of the aircraft after its delivery to an airline. It is also easy to move an electrical equipment item in the fuselage of the aircraft, for example during a modification of the configuration of the aircraft: it is sufficient for that to remove its original local electrical power supply link, to bring the electrical equipment item to its new position in the fuselage and to put in place a new local electrical power supply link to another connection point of a bus. The use of a set of buses rather than cable harnesses also makes it possible to reduce the weight of the electrical power distribution network of the aircraft. Indeed, the electrical conductors of a bus used in common by several electrical equipment items require a smaller dimensioning than the sum of the dimensionings of separate cables, in harnesses powering these same electrical equipment items.

Figure 2:
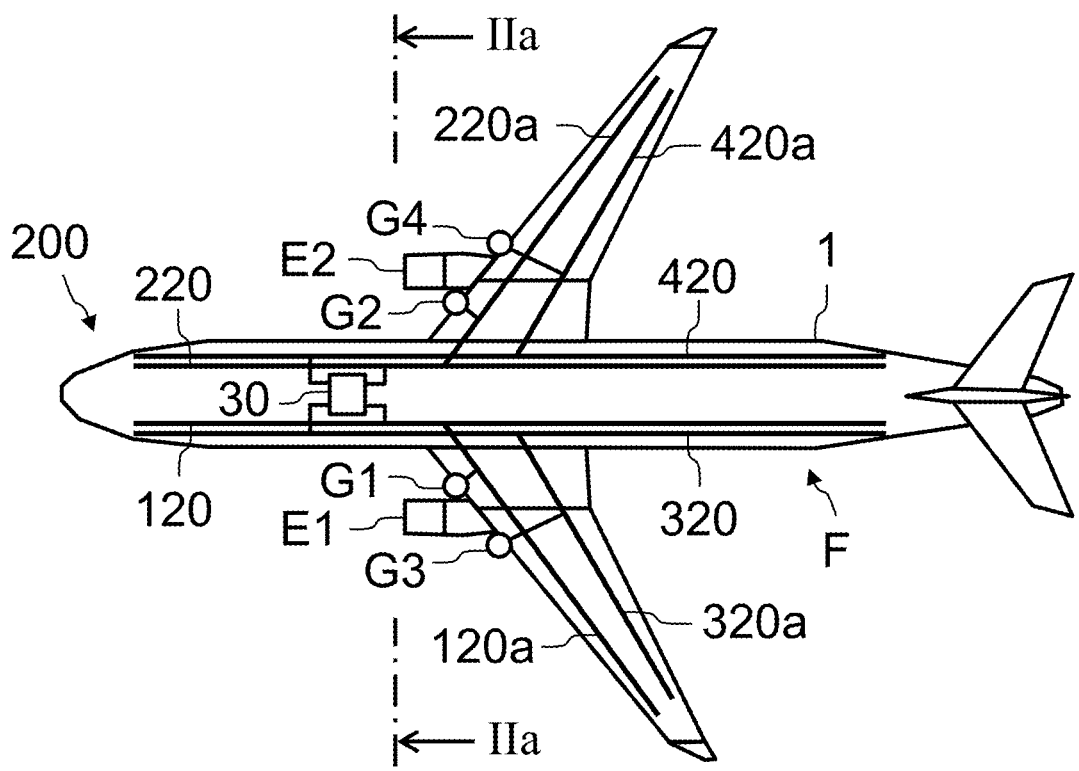
FIG. 2 schematically represents an aircraft comprising an electrical power distribution network, according to another embodiment of the invention.
Figure 3:
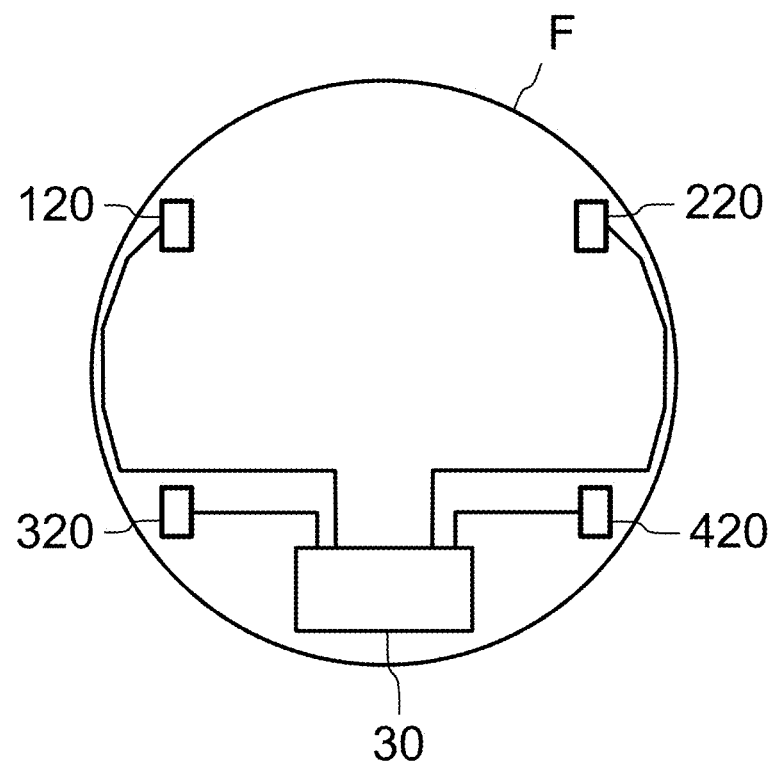
FIG. 3 is a cross-sectional view taken along the line IIa-IIa of FIG. 2.

In another embodiment represented in FIG. 2, the aircraft 1 further comprises a third generator G3 in proximity to the engine E1 and a fourth generator G4 in proximity to the engine E2. The set of buses further comprises a third bus 320, 320*a* and a fourth bus 420, 420*a*. The third bus and the fourth bus each comprise a part 320, respectively 420, extending in a longitudinal direction of the fuselage F. The four buses follow segregated paths in the fuselage, as represented in FIG. 3. As indicated previously, the part 120 of the first bus runs in a left-hand part of the fuselage and the part 220 of the second bus runs in a right-hand part of the fuselage. Likewise, the part 320 of the third bus runs in a left-hand part of the fuselage and the part 420 of the fourth bus runs in a right-hand part of the fuselage. The part 120 of the first bus and the part 220 of the second bus run in an upper part of the fuselage, whereas the part 320 of the third bus and the part 420 of the fourth bus run in a lower part of the fuselage. Advantageously, the third bus comprises a part 320*a* in the left wing of the aircraft and the fourth bus comprises a part 420*a* in the right wing of the aircraft. Like the first bus 120, 120*a* and the second bus 220, 220*a*, the third bus 320, 320*a* and the fourth bus 420, 420*a* are also linked to the switching system 30. In the normal mode of operation, the switching system 30 is configured to electrically link the third electrical generator G3 to the third bus and the fourth electrical generator G4 to the fourth bus. In a particular embodiment, the third electrical generator G3 is linked electrically to the switching system 30 via dedicated conductors (or bars) of the third bus 320, 320*a* and the fourth electrical generator G4 is linked electrically to the switching system via dedicated conductors of the fourth bus 420, 420*a*.

For example, the third generator G3 situated in the left wing of the aircraft, in proximity to the engine E1, is linked to dedicated conductors of the part 320a of the third bus, by a local electrical power supply link between this generator and this part 320a of the third bus. In the same way, the fourth generator G4 situated in the right wing of the aircraft, in proximity to the engine E2, is linked to dedicated conductors of the part 420a of the fourth bus, by a local electrical power supply link between this generator and this part 420a of the fourth bus.

Figure 4:
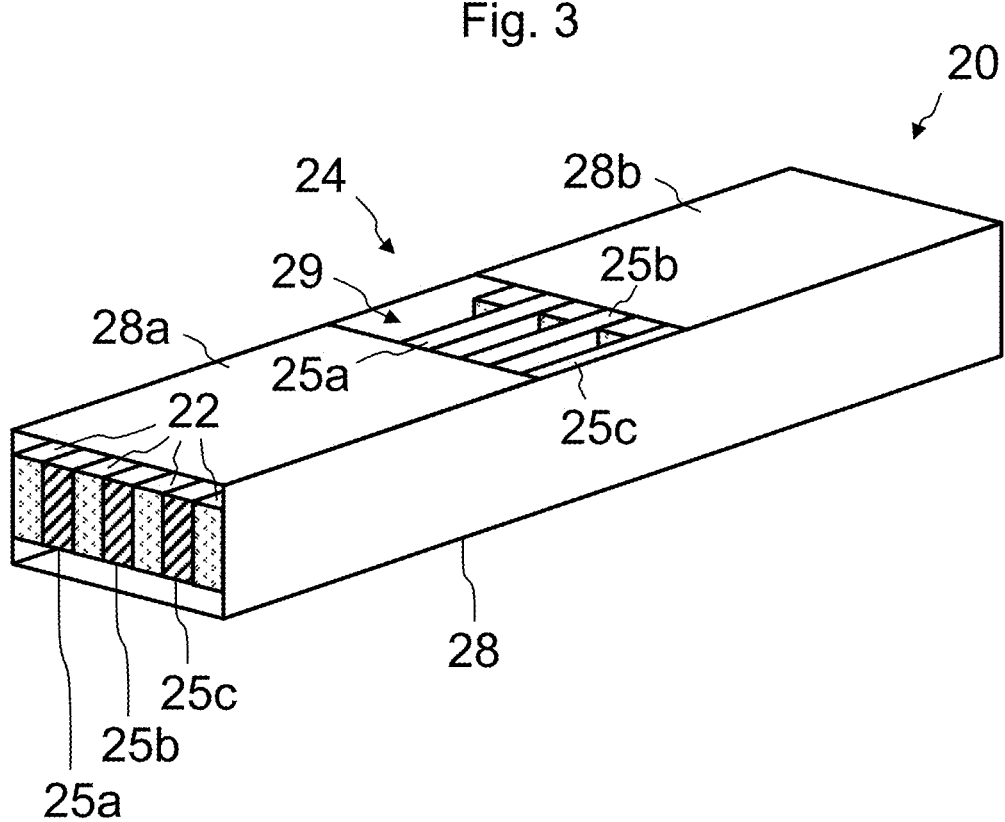
FIG. 4 is a perspective view of a bus.

In an exemplary embodiment represented in FIG. 4, a bus 20 of the set of buses comprises a set of electrical conductors corresponding to bars 25a, 25b, 25c. Although three bars 25a, 25b and 25c are represented in the figure, this number of bars should not be interpreted as limiting on the invention. The person skilled in the art will be able to adapt the number of bars as a function of the different electrical voltages to be distributed to the electrical equipment items of the aircraft by means of the electrical power distribution network 200 and as a function of the number of separate segregations required. These bars run parallel or substantially parallel along a length of the bus 20. They are separated from one another by an electrically insulating material 22, for example a plastic material or air. The set of bars is surrounded by an enclosure 28. According to an embodiment, this enclosure is formed by an electrically insulating material. According to another embodiment, the enclosure 28 is formed by an electrically conductive material. An electrically insulating material 22 is then arranged between the bars 25a, 25b and 25c, on the one hand, and the enclosure 28, on the other hand. This other embodiment is advantageous, because it makes it possible to use the enclosure 28 as an electrical current return conductor (for example neutral conductor in alternating current, 0 volt in direct voltage, etc.) and/or as electromagnetic shielding, making it possible to avoid electromagnetic disturbances of electrical equipment items of the aircraft by electrical currents circulating in the bars 25a, 25b, 25c. The part of bus 20 represented in the figure comprises a connection point 24. This connection point comprises an opening 29 in the enclosure 28, for example on a top face (in the figure) of the enclosure. The opening 29 thus delimits two parts 28a and 28b of the top face of the enclosure 28. The part of the set of bars 25a, 25b, 25c situated facing the opening 29 is without insulation 22 when this insulation corresponds to a plastic material, so as to allow the connection of a connection means to the bars 25a, 25b, 25c through the opening 29. Such a connection means corresponds, for example, to a connector comprising sets of spring-forming blades, capable of being put in place on the bars.

Advantageously, the switching system 30 comprises a so-called reconfigured mode of operation, which can be activated in case of the occurrence of a failure in the electrical power distribution network. In the reconfigured mode of operation, according to a first variant, the switching system 30 is configured to establish electrical links between, on the one hand, the electrical generators G1, G2 (and possibly G3, G4 according to the embodiment) of the set of electrical generators and, on the other hand, the buses of the set of buses, these electrical links being modified by comparison to electrical links established in the normal mode of operation. According to a second variant, the switching system 30 is configured to establish electrical links between the buses of the set of buses. This second variant can be combined with the first variant. For example, in the case of failure of the generator G3 (which powers the third bus 320, 320a in the normal mode of operation), the switching system modifies the electrical links so as to power the first bus 120, 120a, and the third bus 320, 320a, from the generator G1.

Figure 6A:
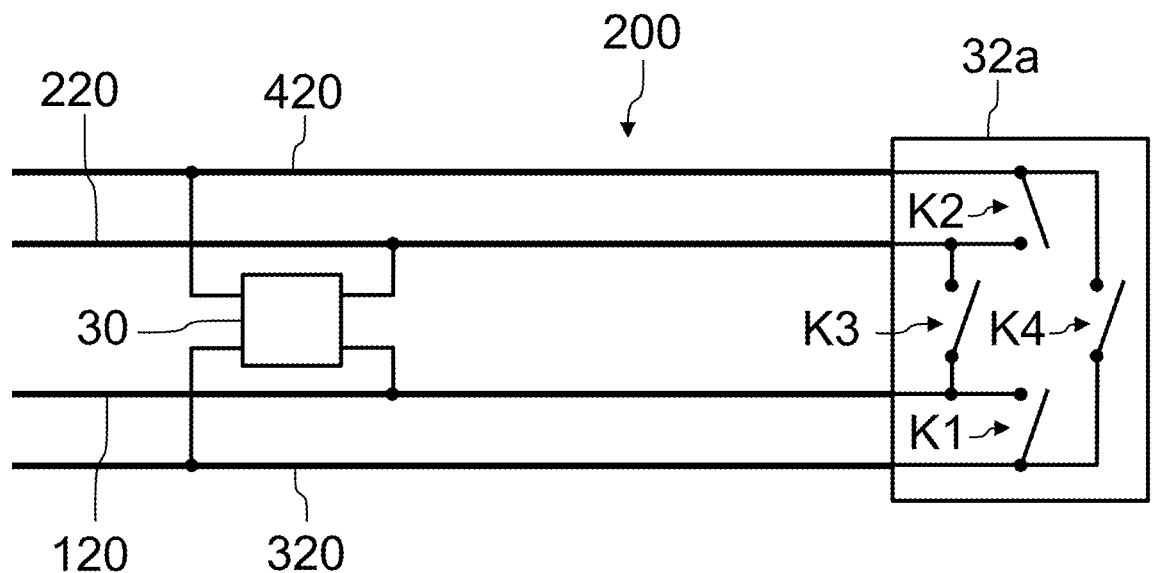
FIGS. 6a and 6b schematically represent a part of the electrical power distribution network of the aircraft represented in FIG. 2, comprising secondary switches according to a particular embodiment.
Figure 6B:
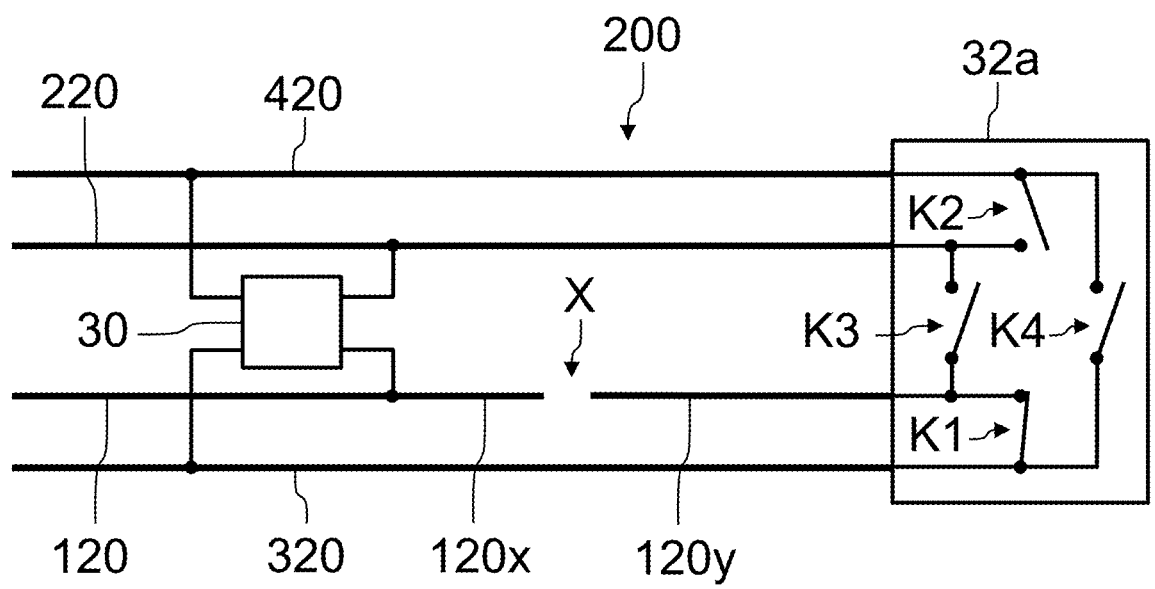

In a particular embodiment, the switching system comprises a main switching device and at least one secondary switching device remote from the main switching device. The main switching device is similar to the switching system 30 represented in FIGS. 1, 2 and 3 and described previously. It ensures, for example, an electrical core function of the aircraft. The at least one secondary switching device is controlled by the switching system 30 to which it is linked by a specific communication link or by a communication network of the aircraft. In the example represented in FIGS. 6a and 6b, a secondary switching device 32a is remotely situated at an end of the buses of the set of buses, for example in a rear part or in a front part of the fuselage F of the aircraft. The secondary switching device 32a comprises four switches K1, K2, K3, K4, corresponding, for example, to contactors that can be controlled by the switching system 30. For example, these contactors comprise at least as many contacts as there are electrical conductors 25a, 25b, 25c, etc., in the buses. In the normal mode of operation of the switching system, as represented in FIG. 6a, the contacts of the switches K1, K2, K3 and K4 are open, such that they establish no link between the buses 120, 220, 320 and 420. FIG. 6b illustrates a situation in which a failure X has occurred on the first bus 120. This failure has the effect of electrically isolating from one another two parts 120x and 120y of the first bus 120. The result thereof is that, in the normal mode of operation, the part 120y of the first bus is no longer powered by the first generator G1 via the switching system 30. To provide a solution to this problem, in the reconfigured mode of operation, the switching system controls the remote switching device 32a in such a way as to close the contacts of the switch K1. That has the effect of linking to one another the similar conductors, on the one hand, of the part 120y of the first bus and, on the other hand, of the third bus 320. This part 120y of the first bus is then powered by the third generator G3 via the switching system 30.

In an advantageous embodiment, at least one of the buses of the set of buses comprises at least two sections arranged end-to-end and linked electrically to one another. That is of particular interest when the aircraft 1 is formed by the assembly of sections of the fuselage F. These sections of fuselage are then pre-equipped with bus sections which are linked to one another during or after the assembly of the sections of fuselage. For example, each of the parts 120, 220, 320 and 420 of the first, second, third and fourth buses is composed of an assembly of bus sections arranged end-to-end and linked electrically to one another. According to a first alternative, the bus sections are specific to the sections of fuselage in which they are incorporated. According to a second alternative, each bus section incorporated in a section of fuselage is composed of an assembly of modular bus sections arranged end-to-end and linked electrically to one another. Advantageously, these modular bus sections correspond to a restricted number of lengths shrewdly chosen so as to allow the pre-equipment of the different sections of fuselage by combining modular sections corresponding to these predefined lengths.

Figure 7A:
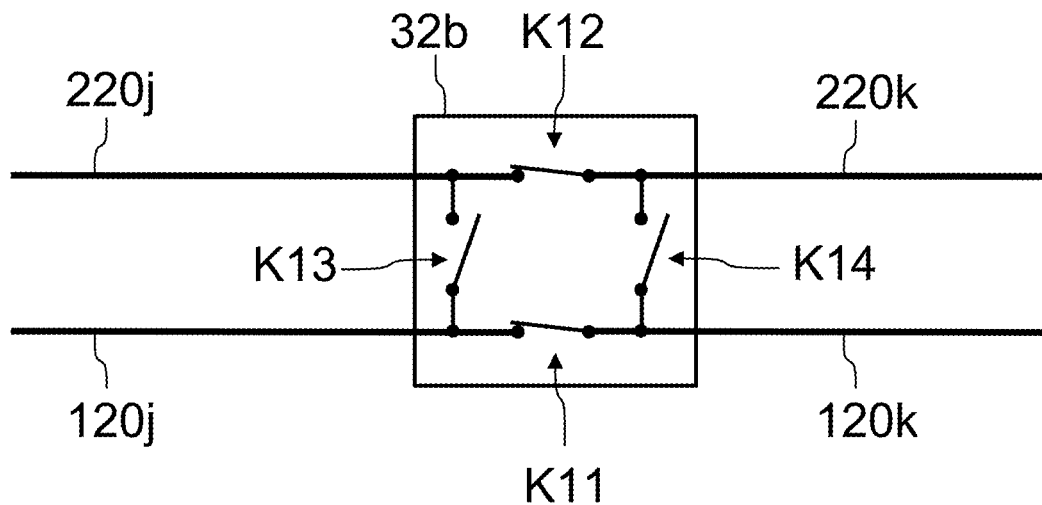
FIGS. 7a and 7b schematically represent a part of the electrical power distribution network of the aircraft represented in FIG. 1 or in FIG. 2, comprising secondary switches according to a particular embodiment.
Figure 7B:
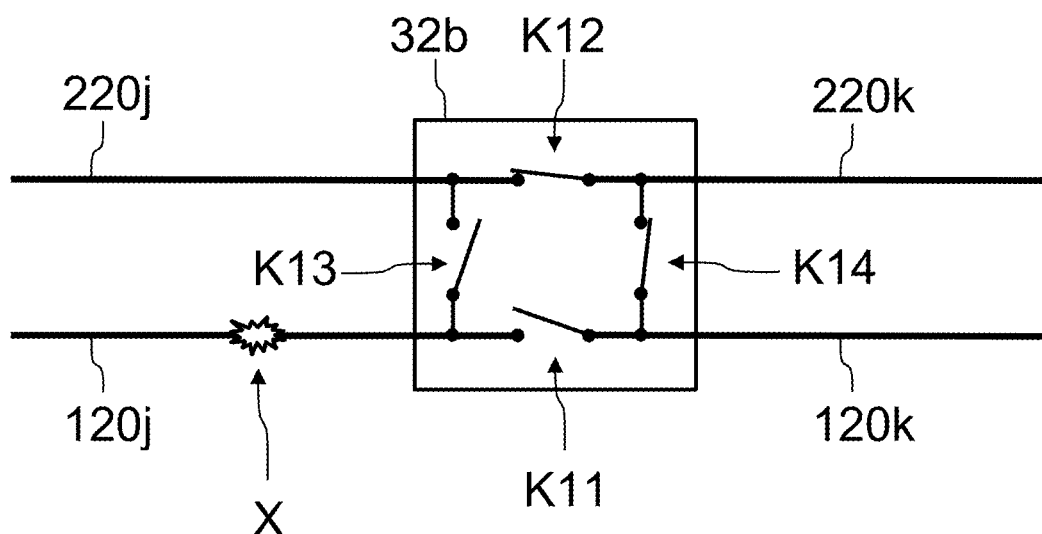

In particular, a secondary switching device 32b is linked electrically to two consecutive sections (or two modular sections) of a bus. In an example represented in FIGS. 7a and 7b, a secondary switching device 32b is put in place between, on the one hand, two bus sections 120j and 220j and, on the other hand, two bus sections 120k and 220k. The sections 120j and 120k correspond to two consecutive sections of the first bus 120. The sections 220*j* and 220*k* correspond to two consecutive sections of the second bus 220. The secondary switching device 32*b* comprises four switches K11, K12, K13, K14, corresponding, for example, to contactors that can be controlled by the switching system 30. For example, these contactors comprise at least as many contacts as there are electrical conductors 25*a*, 25*b*, 25*c*, etc. in the buses. In the normal mode of operation of the switching system, as represented in FIG. 7*a*, the contacts of the switches K11 and K12 are closed so as to establish electrical links between similar electrical conductors of the sections 120*j* and 120*k* of the first bus, on the one hand, and 220*j* and 220*k* of the second bus, on the other hand. The contacts of the switches K13 and K14 are open, in such a way that they establish no link between the first bus and the second bus. FIG. 7*b* illustrates a situation in which a failure X has occurred on the section 120*j* of the first bus 120. The switching system 30 although not represented in the figure, is considered to be to the left of the sections 120*j* and 220*j* in the figure. The failure X has the effect of interrupting the electrical power supply of the bus 120*k* by the generator G1 via the switching system 30 and the bus 120*j*. To resolve this problem, in a reconfigured mode of operation, the switching system 30 orders the opening of the contacts of the switch K11 and the closing of the contacts of the switch K14. That has the effect of linking to one another the similar contacts of the section 220*j* of the second bus and of the section 120*k* of the first bus. This section 120*k* of the first bus is then powered by the second generator G2 via the switching system 30 and the bus 220*j*.

Figure 8:
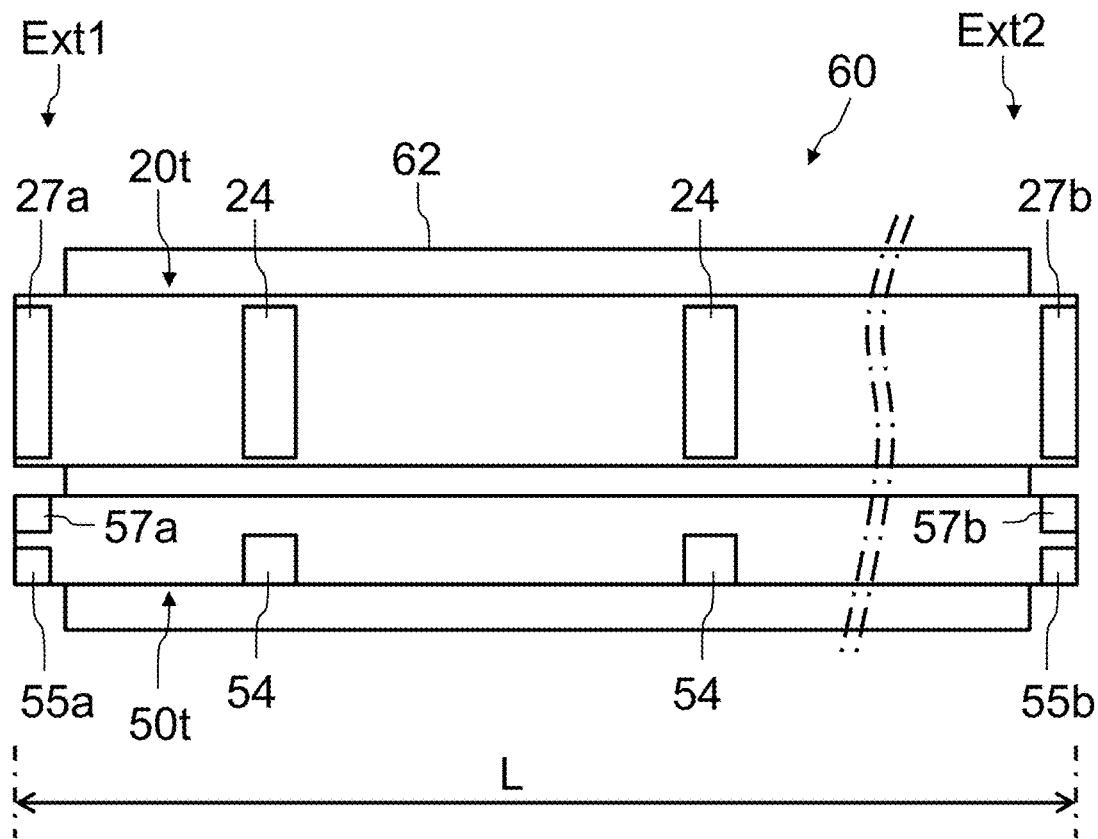
FIG. 8 schematically represents a modular element for a hybrid electrical power distribution and data communication network of an aircraft, according to an embodiment of the invention.

According to an embodiment in accordance with the second aspect of the invention, as represented in FIG. 8, the modular element 60 for a hybrid electrical power distribution and data communication network of an aircraft comprises:
 a section of an electrical power distribution bus 20*t*, extending along a length L of the modular element 60; and
 a set of data links 50*t*, this set of data links extending along the length L of the modular element, substantially parallel to the bus section 20*t*.

Preferably, the bus section 20*t* and the set of data links 50*t* are mounted secured to one another. For that, in the example represented in FIG. 8, the bus section 20*t* and the set of data links 50*t* are fixed onto a common support 62. In another exemplary embodiment, not represented, the data links of the set of data links 50*t* are attached to the bus section 20*t*. In a particular embodiment in which these data links correspond to optical fiber ribbon cables, these optical fiber ribbon cables are, for example, glued onto a face of the bus section 20*t*.

According to a first alternative, the data links of the set of data links 50*t* correspond to twisted pairs of copper or aluminum wires. According to another alternative, the data links correspond to optical fibers. In addition to a significant weight saving, these optical fibers offer the advantage of being insensitive to any electromagnetic disturbances which could be produced when an electrical current circulates in bars of the bus section 20*t*.

The bus section 20*t* comprises connection points 24 at different locations distributed along its length. The set of data links 50*t* comprises connection points 54 at different locations distributed along its length and each arranged in proximity to (or facing) a connection point 24 of the bus section 20*t*. The modular element 60 thus comprises pairs of connection points, each comprising, on the one hand, a connection point 24 of the bus section 20*t* and, on the other hand, the connection point 54 of the set of data links 50*t*, situated in proximity to the connection point 24. The bus section 20*t* comprises a first interconnection point 27*a* and the set of data links 50*t* comprises a first interconnection point 57*a*. These first interconnection points 27*a* and 57*a* are situated at a first longitudinal end Ext1 of the modular element 60. These first interconnection points 27*a* and 57*a* are provided to link the bus section 20*t* and the set of data links 50*t* respectively to a bus section and to a set of data links of a first other modular element arranged longitudinally in series with the modular element 60. The bus section 20*t* comprises a second interconnection point 27*b* and the set of data links 50*t* comprises a second interconnection point 57*b*. These second interconnection points 27*b* and 57*b* are situated at a second longitudinal end Ext2 of the modular element 60. These second interconnection points 27*b* and 57*b* are provided to link the bus section 20*t* and the set of data links 50*t* respectively to a bus section and to a set of data links of a second other modular element arranged longitudinally in series with the modular element 60.

The set of data links 50*t* also comprises at least one connection point, called cross-connect point, provided to receive a cross-connect rack. According to a first variant, this at least one cross-connect point is situated at a longitudinal end of the modular element 60. In the example represented in FIG. 8, the set of data links 50*t* comprises two cross-connect points 55*a* and 55*b* situated respectively at the first longitudinal end Ext1 and at the second longitudinal end Ext2 of the modular element 60. According to a second variant illustrated by FIG. 9, the at least one cross-connect point 55 is situated between two connection points 54 of the set of data links 50*t*. These two variants can be combined with one another: the modular element 60 then comprises one or two cross-connect points 55*a*, 55*b* at at least one of its longitudinal ends Ext, Ext2, and at least one cross-connect point situated between two connection points 54.

The set of data links 50*t* also comprises at least one data link between, on the one hand, each of the connection points distributed along its length and, on the other hand, the cross-connect point. These data links 56 are not represented in FIGS. 8 and 9 for reasons of clarity of the figures. As represented in FIG. 10 schematically illustrating the data links corresponding to FIG. 8, at least one data link is provided between, on the one hand, each cross-connect point 55*a*, 55*b* and, on the other hand, each connection point 54*a*, 54*b* . . . 54*f*. For example, the set of data links 50*t* comprises at least one data link 56*b*1 between the cross-connect point 55*a* and the connection point 54*b* and at least one data link 56*b*2 between the cross-connect point 55*b* and the connection point 54*b*. Several data links 56 can be provided between each cross-connect point 55*a*, 55*b* and the different connection points 54*a* . . . 54*f*, although only one link is represented in FIG. 10. In particular, when the data links are implemented by means of optical fibers, each link represented in the figure can in fact correspond to a set of optical fibers, for example eight optical fibers.

Advantageously, the set of data links 50*t* also comprises data links 58 between the first interconnection point 57*a* and the second interconnection point 57*b*. These data links 58 are, in particular, used to make it possible to establish communications passing through several modular elements 60.

Figure 9:
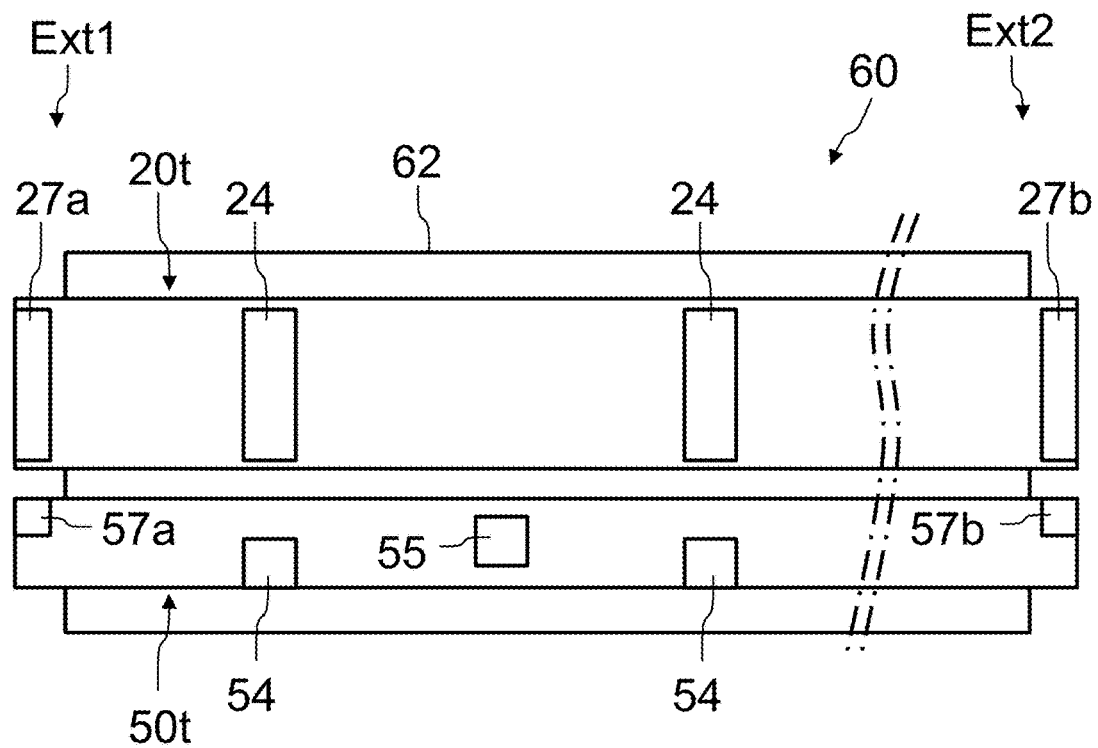
FIG. 9 schematically represents a modular element for a hybrid electrical power distribution and data communication network of an aircraft, according to another embodiment of the invention.
Figure 10:
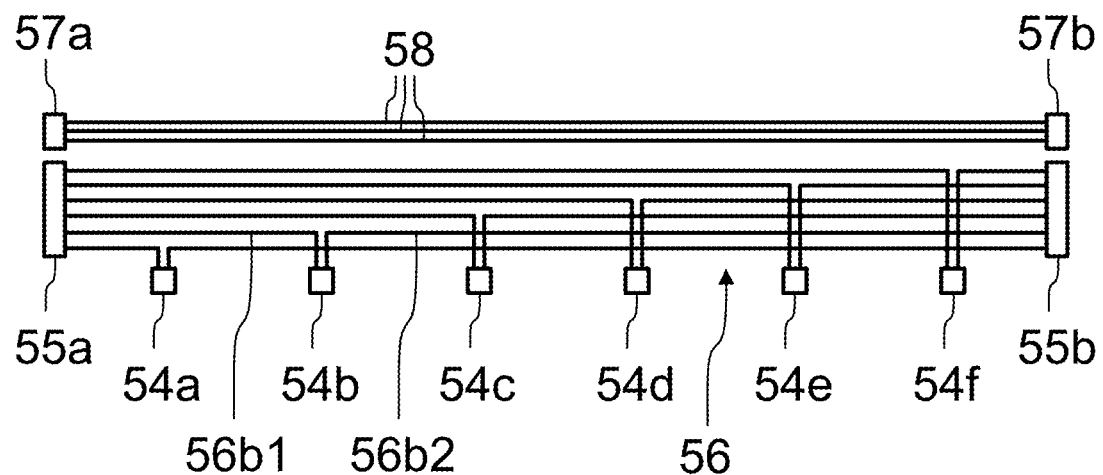
FIGS. 10 and 11 represent data links of the modular elements corresponding respectively to FIGS. 8 and 9.
Figure 11:
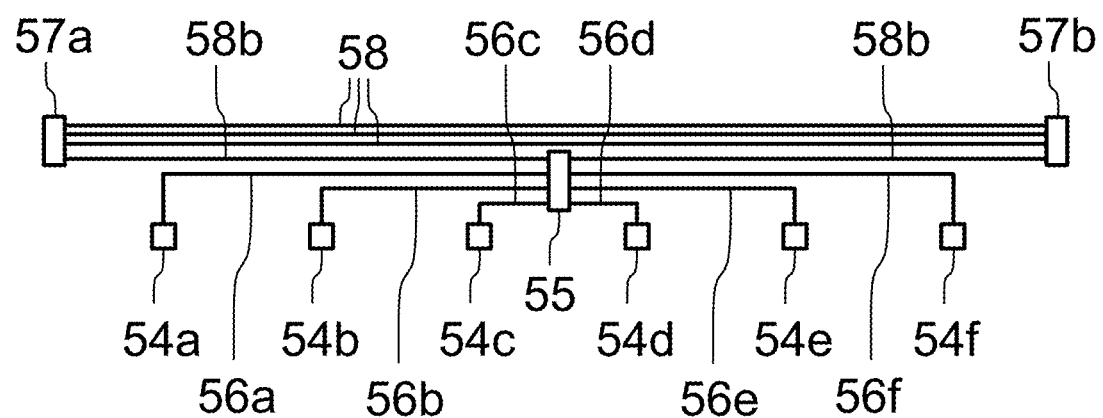

In the example represented in FIG. 11 schematically illustrating the data links corresponding to FIG. 9, at least one data link 56*a*, 56*b*, . . . 56*f* is provided between the cross-connect point 55 and each connection point 54*a*, 54*b* . . . 54*f*. In addition, at least one data link 58*b* is provided between the cross-connect point 55 and each interconnection point 57*a*, 57*b*.

The cross-connect point (points) is (are) provided to receive a cross-connect rack. The modular element 60 comprises, for example, at least one fixing provided to allow the fixing of the cross-connect rack to the modular element. This fixing can, in particular, correspond to a nut or to a screw, to a mechanical part provided to cooperate with a part of the cross-connect rack so as to clip the latter onto the modular element, etc. Advantageously, in the cross-connect points 55, 55*a*, 55*b*, the data links 56 arrive on one or more cross-connect connectors that can be incorporated in the corresponding cross-connect rack.

Figure 12:
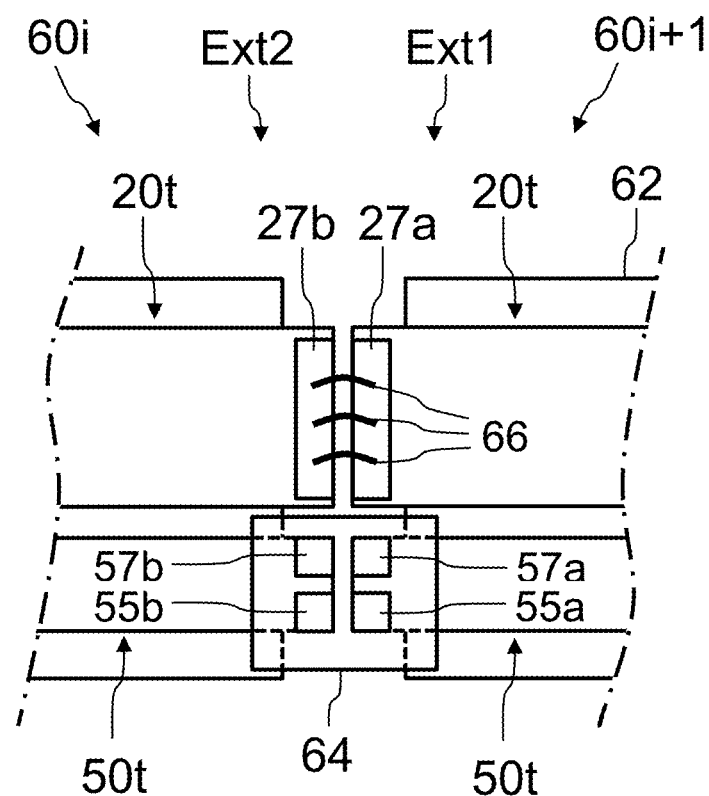
FIG. 12 represents an example of interconnection of two modular elements.

An example of interconnection of two consecutive modular elements is illustrated by FIG. 12, in the case of modular elements 60*i*, 60*i*+1 similar to the modular element 60 represented in FIG. 8. The first end Ext1 of the modular element 60*i*+1 is connected to the second end Ext2 of the modular element 60*i*. For that, these two ends are arranged end-to-end, in proximity to one another, in such a way that the first interconnection point 27*a* of the bus 20*t* of the modular element 60*i*+1 faces the second interconnection point 27*b* of the bus 20*t* of the modular element 60*i* and the first interconnection point 57*a* of the set of data links 50*t* of the modular element 60*i*+1 faces the second interconnection point 57*b* of the set of data links 50*t* of the modular element 60*i*. The similar conductors of the interconnection points 27*a* and 27*b* are linked electrically to one another by means of electrical links 66. In a first exemplary embodiment, the interconnection points 27*a* and 27*b* correspond to terminal blocks and the electrical links 66 then correspond to cables of appropriate section. In a second exemplary embodiment, the interconnection points 27*a* and 27*b* correspond to connectors. The electrical links 66 then correspond, for example, to a connection of the connectors. In particular, when they are connected, these connectors can slide longitudinally in relation to one another so as to absorb longitudinal displacements of the two modular elements relative to one another, in particular, upon structural deformations of the aircraft in which the modular elements are installed. A cross-connect rack 64 is installed so as to receive the interconnection points 57*a* of the modular element 60*i*+1 and 57*b* of the modular element 60*i*, as well as the cross-connect points 55*a* of the modular element 60*i*+1 and 55*b* of the modular element 60*i*. Advantageously, these interconnection and cross-connect points are equipped with connectors which are then incorporated in the cross-connect rack. The cross-connect rack makes it possible to install the required interconnections, for example by means of jumper links. It also allows for the incorporation of active elements, for example of switch or of router type, when such equipment items are necessary to produce the interconnections. These active elements correspond, for example, to switches or routers of Ethernet or USB type. The jumper links correspond to wired jumper links when the data links are of wired type (for example twisted pairs of copper or aluminum wires) or to optical jumper links when the data links correspond to optical fibers. The cross-connect rack receiving the interconnection points 57*a*, 57*b* and the cross-connect points 55*a*, 55*b*, allows for the installation of jumper links to produce different types of interconnections. A first type of interconnection corresponds to an interconnection of a first link between one of the cross-connect points 55*a*, 55*b* and a connection point 24 of the set of data links of one of the modular elements 60*i*, 60*i*+1, with a second link between one of the cross-connect points 55*a*, 55*b* and a connection point 24 of the set of data links of one of the modular elements 60*i*, 60*i*+1. A second type of interconnection corresponds to an interconnection of a first link between one of the cross-connect points 55*a*, 55*b* and a connection point 24 of the set of data links of one of the modular elements 60*i*, 60*i*+1, with a second link arriving on one of the interconnection points 57*a*, 57*b*. A third type of interconnection corresponds to an interconnection of a first link arriving on one of the interconnection points 57*a*, 57*b*, with a second link arriving on the other of the interconnection points 57*a*, 57*b*. Several modes of installation of the cross-connect rack 64 are possible without departing from the scope of the invention. According to a first example, the cross-connect rack is fixed onto at least one of the modular elements 60*i*, 60*i*+1 so as to cover the cross-connect points 55*a*, 55*b* and the interconnection points 57*a*, 57*b*, which enter into the cross-connect rack by one or more cutouts thereof. According to a second example, the cross-connect rack is fixed either onto at least one of the modular elements 60*i*, 60*i*+1, in proximity to its end Ext2, Ext1, or onto the structure of the aircraft in proximity to the ends Ext2, Ext1 of the modular elements 60*i*, 60*i*+1, without the cross-connect rack covering these interconnection and cross-connect points. The interconnection points 57*a*, 57*b* and the cross-connect points 55*a*, 55*b* are then arranged at ends of data links of the sets of data links 50*t* that are sufficiently long and sufficiently flexible to allow the incorporation of the interconnection and cross-connect points in the cross-connect rack 64.

Figure 13:
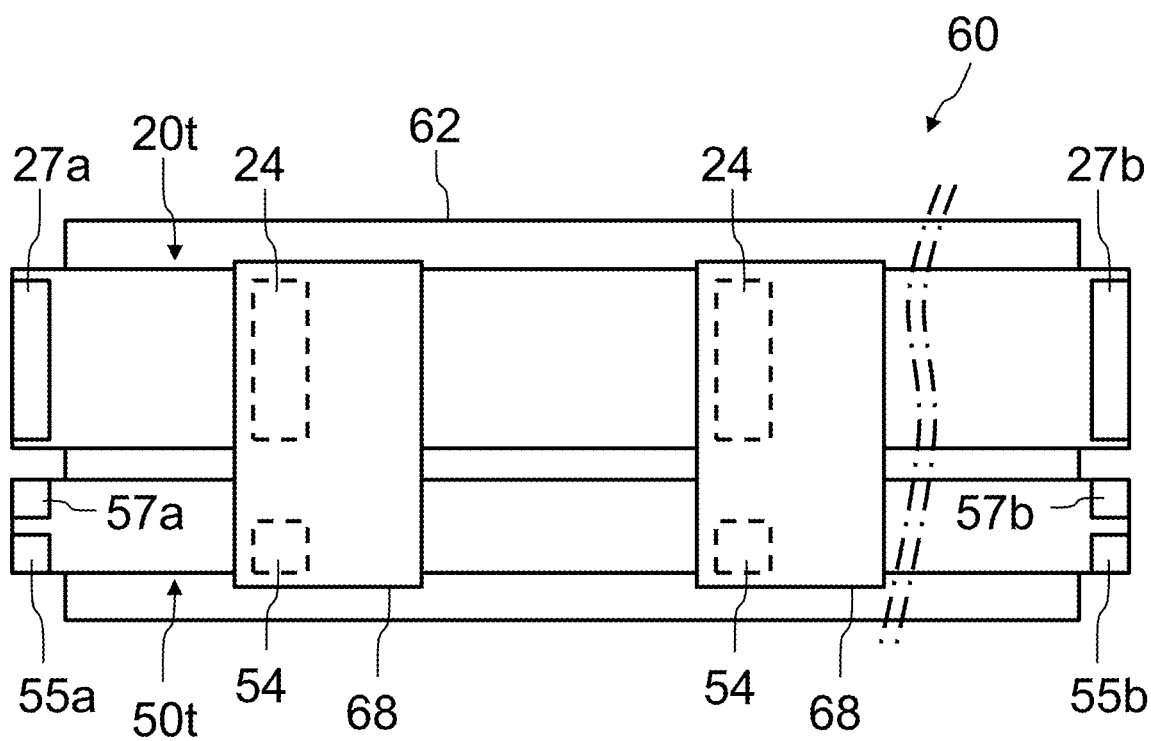
FIG. 13 schematically represents a modular element equipped with junction boxes.

In a particular embodiment represented in FIG. 13, each of the different pairs of connection points 24, 54 of the modular element 60 is provided to receive a hybrid electrical power distribution and data communication junction box 68. Such a hybrid junction box allows the connection of one or more local electrical power supply distribution and/or data distribution links to one or more electrical equipment items of the aircraft. The use of hybrid junction boxes facilitates the connection of the electrical equipment items to the modular elements 60: thus, it is not necessary to connect each electrical equipment item to the bus section 20*t* and to a data link of the set of data links 50*t*. The junction box 68 is, for example, provided with connectors facilitating the connection of local links to the electrical equipment items. Advantageously, a pair of connection points is equipped with a junction box only if an electrical equipment item is connected to this pair of connection points. That makes it possible to avoid unnecessarily increasing the weight of the aircraft.

In another particular embodiment, the bus section 20*t* comprises at least one flexible part provided to allow deformations of the modular element 60 in response to deformations of the fuselage F of an aircraft when the modular element is installed in the fuselage of an aircraft. For example, to produce such a flexible part, each electrically conductive element of the bus section 20*t* comprises a spring over a part of its length.

In a particular exemplary embodiment, the length L of a modular element 60 lies between 3 and 10 meters, preferably between 6 and 10 meters. In particular, two consecutive pairs of connection points of the modular element are spaced apart by a distance of approximately 50 to 70 cm. This distance corresponds, for example, to the distance between two structural frames of the aircraft. The junction boxes 68 can, for example, be installed every four or five pairs of connection points in most of the fuselage. However, in zones of the fuselage corresponding to a particularly high density of electrical equipment items, all the pairs of connection points, or sometimes one pair of connection points in every two, can be equipped with junction boxes.

Figure 14:
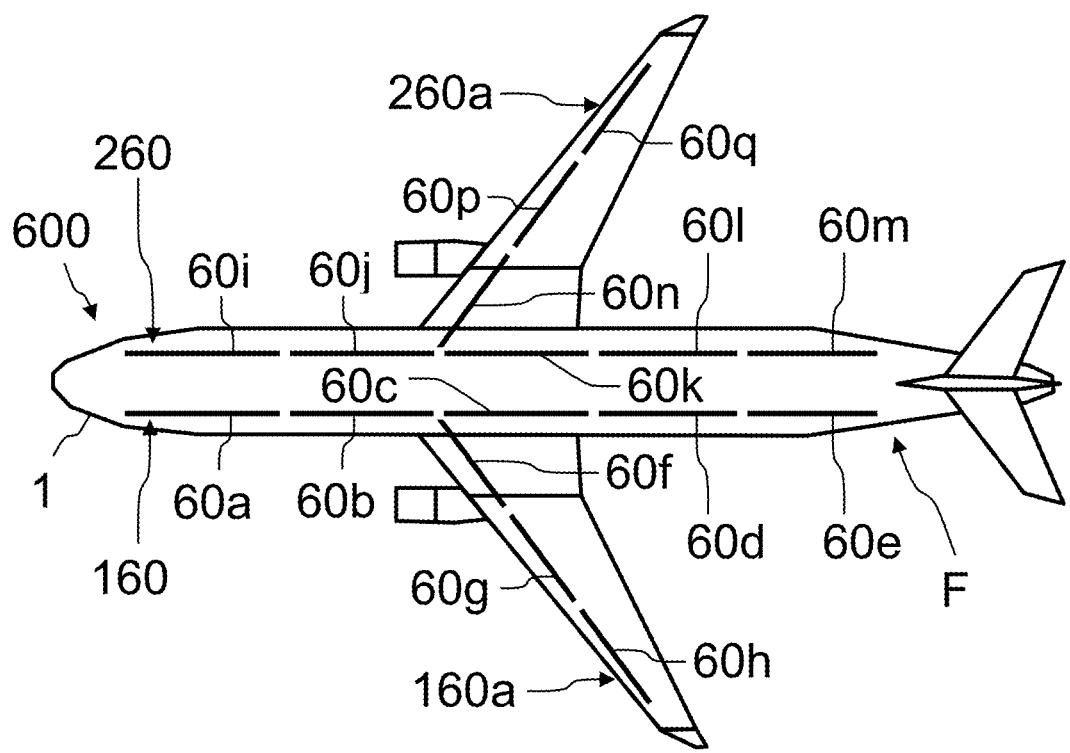
FIG. 14 schematically represents an aircraft comprising a hybrid electrical power distribution and data communication network, comprising a set of modular elements.

The invention also relates to an aircraft 1 comprising a fuselage F and a set of electrical equipment items distributed in the fuselage. As represented in FIG. 14, the aircraft comprises a hybrid electrical power distribution and data communication network 600 comprising a set of modular elements 60a . . . 60q similar to the abovementioned modular element 60. The hybrid network 600 comprises a first hybrid electrical power distribution and data communication subnetwork 160, 160a. This first hybrid subnetwork is formed by assembly between two modular elements 60a . . . 60h forming a first subset of the set of modular elements. The first hybrid subnetwork comprises a part 160 which extends longitudinally in the fuselage F of the aircraft. Advantageously, it also comprises a part 160a which extends in the left wing of the aircraft. The hybrid network 600 also comprises a second hybrid electrical power distribution and data communication subnetwork 260, 260a. This second hybrid subnetwork is formed by assembly between themselves of modular elements 60i . . . 60q forming a second subset of the set of modular elements. The second hybrid subnetwork comprises a part 260 which extends longitudinally in the fuselage F of the aircraft. Advantageously, it also comprises a part 260a which extends in the right wing of the aircraft. The first subnetwork 160, 160a and the second subnetwork 260, 260a follow segregated paths in the fuselage F, for example in a left-hand part of the fuselage for the first subnetwork and in a right-hand part of the fuselage for the second subnetwork, as represented in FIG. 14. Two consecutive modular elements are, for example, assembled together as described with reference to FIG. 12. Each electrical equipment item of the set of electrical equipment items is linked to a connection point 24 of the bus section 20t of a modular element 60a . . . 60q via a local electrical power supply link and/or to a connection point 54 of the set of data links 50t of the modular element by a local data link. For reasons of clarity of FIG. 14, the electrical equipment items and the local links are not represented. The use of modular elements in accordance with the invention to construct the hybrid network 600 makes it possible to easily adapt this network to any type of aircraft, without requiring buses or sets of data links specific to the aircraft concerned, in particular with regard to their length. The use of one or of a few types of modular elements of predetermined lengths makes it possible to adapt such a network to any type of aircraft.

Figure 15:
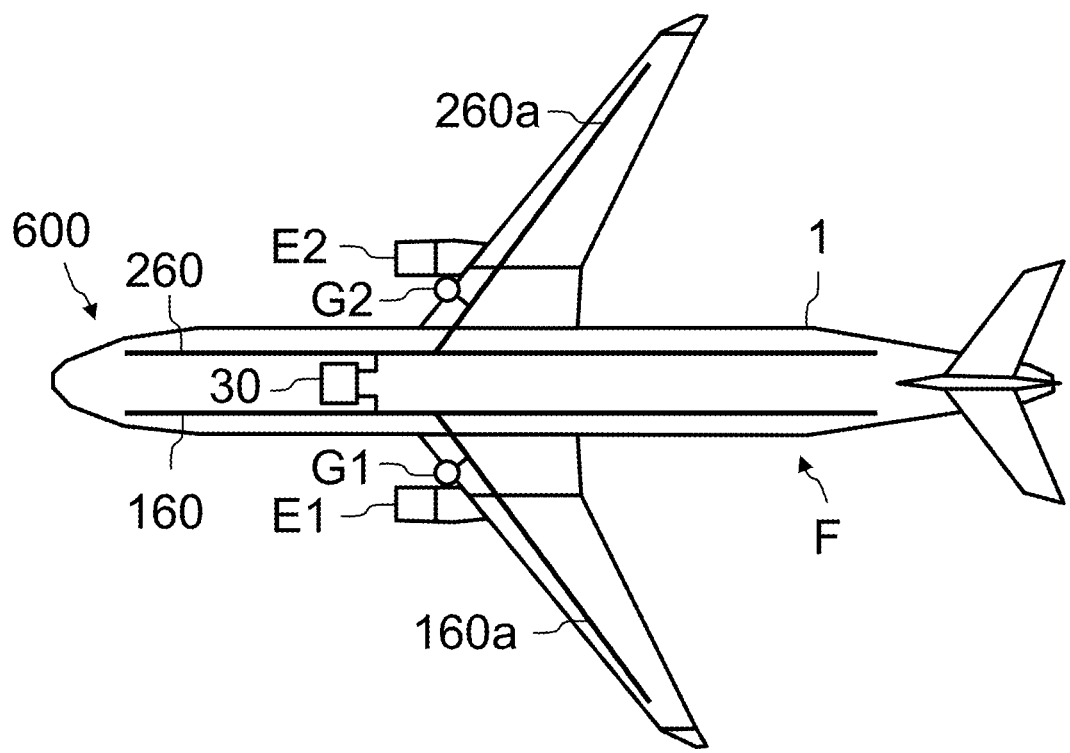
FIG. 15 schematically represents an aircraft comprising a hybrid electrical power distribution and data communication network, according to an embodiment of the invention.

According to an embodiment in accordance with the third aspect of the invention, the aircraft 1 represented in FIG. 15 comprises a fuselage F and a set of electrical generators comprising a first generator G1 associated with an engine E1 of the aircraft and a second generator G2 associated with an engine E2 of the aircraft. The aircraft 1 also comprises a hybrid electrical power distribution and data communication network 600. The hybrid network 600 comprises a set of buses, including a first bus and a second bus. A set of data links is associated with each bus of the set of buses. Each set of data links extends substantially parallel to the bus with which it is associated. The first bus and the set of data links associated with this first bus form a first hybrid electrical power distribution and data communication subnetwork 160, 160a. The second bus and the set of data links associated with this second bus form a second hybrid electrical power distribution and data communication subnetwork 260, 260a. Each of the two subnetworks comprises at least a part 160, respectively 260, extending in a longitudinal direction of the fuselage F. These two subnetworks follow segregated paths in the fuselage F of the aircraft, respectively in a left-hand part of the fuselage (or port) for the part 160 of the first subnetwork in a right-hand part of the fuselage (or starboard) for the part 260 of the second subnetwork. That makes it possible to avoid a common failure on the two subnetworks in the case of an incident in a part of the fuselage. Advantageously, the first subnetwork comprises a part 160a in a left wing of the aircraft and the second subnetwork comprises a part 260a in a right wing of the aircraft. Advantageously, the electrical power distribution network also comprises a switching system 30. This switching system is linked electrically to the first electrical generator G1 and to the second electrical generator G2, and to the first bus of the first subnetwork 160, 160a and to the second bus of the second subnetwork 260, 260a. The switching system 30 comprises a so-called normal mode of operation, in which it is configured to electrically link the first electrical generator G1 to the first bus and the second electrical generator G2 to the second bus. The aircraft 1 also comprises a set of electrical equipment items distributed in the fuselage. For reasons of clarity of the figure, these electrical equipment items are not represented in FIG. 15.

Figure 16:
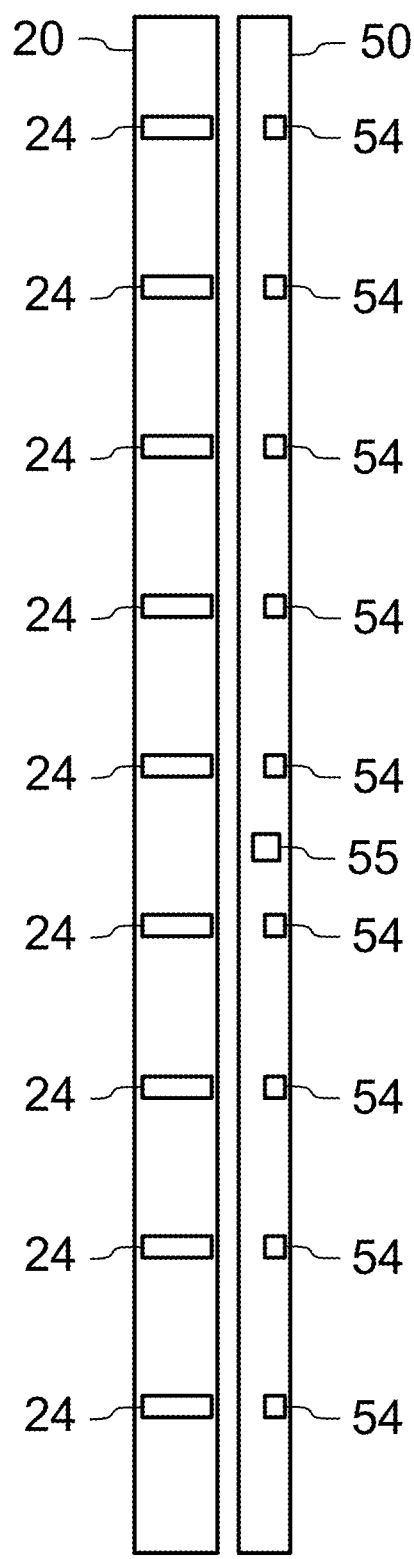
FIG. 16 schematically represents a bus of the hybrid network of FIG. 15, and a set of data links associated with this bus.

As represented in FIG. 16, each bus 20 of the set of buses comprises connection points 24 at different locations distributed along its length and each set of data links 50 comprises connection points 54 at different locations distributed along its length. The connection points 54 are each arranged in proximity to (or facing) a connection point 24 of the bus 20 with which the set of data links 50 is associated, so as to form pairs of connection points each comprising a connection point 24 of the bus and a connection point 54 of the associated set of data links. In a particular exemplary embodiment, two consecutive pairs of connection points are spaced apart by a distance of approximately 50 to 70 cm. This distance corresponds, for example, to the distance between two structural frames of the aircraft.

Although the hybrid electrical power distribution and data communication network 600 has been described in the particular case where it comprises two subnetworks 160, 160a and 260, 260a, the third aspect of the invention is in no way limited to this number of subnetworks. For example, the hybrid network 600 can comprise four subnetworks following segregated paths in the fuselage of the aircraft, in the same way as the electrical power distribution network 200 in accordance with the first aspect of the invention can comprise four buses following segregated paths in the fuselage.

In an advantageous embodiment, at least one bus 20 of the set of buses comprises at least two modular sections arranged end-to-end and linked electrically to one another. This at least one bus forms part of one of the subnetworks 160, 160a or 260, 260a. Each of the at least two modular sections of the at least one bus forms part of a modular element also comprising a set of data links extending substantially parallel to the modular section concerned. Such a modular element corresponds, for example, to the modular element 60 in accordance with an embodiment of the second aspect of the invention. The sets of data links of consecutive modular elements are linked to one another so as to form the set of data links 50 associated with the bus 20 concerned.

Figure 17:
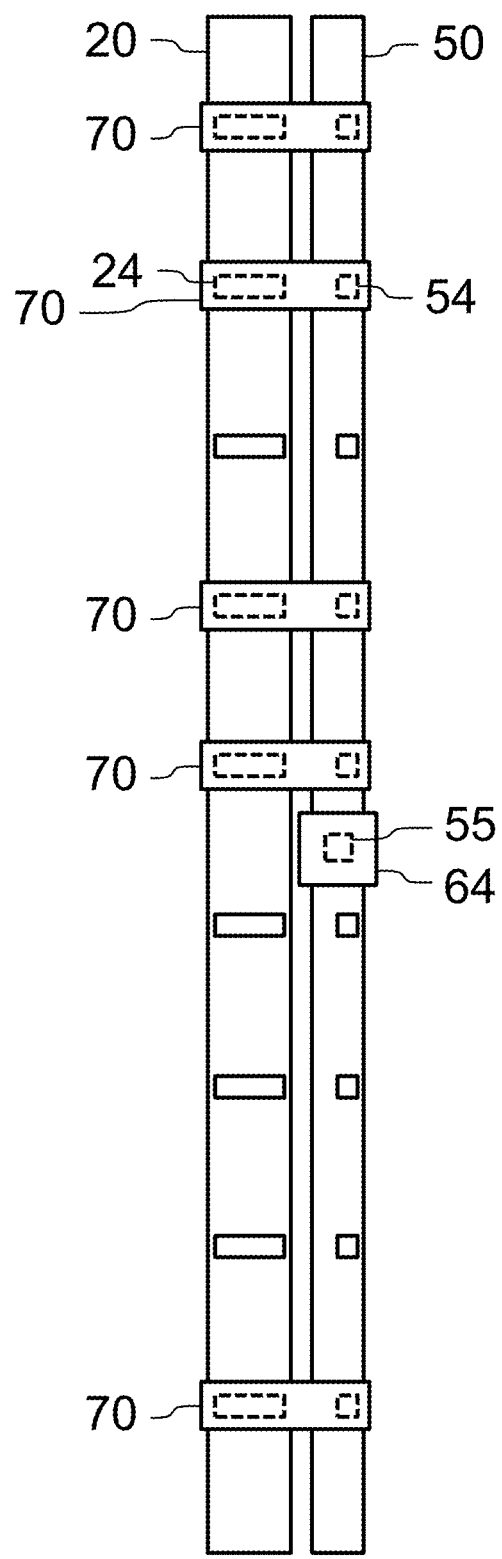
FIG. 17 schematically represents the bus and the set of data links of FIG. 16, equipped with junction boxes.

Advantageously, the hybrid electrical power distribution and data communication network 600 comprises a set of junction boxes, each junction box 70 being connected to a pair of connection points 24, 54 as represented in FIG. 17. These junction boxes are provided to allow the connection of the electrical equipment items of the aircraft to the connection points 24 of the bus 20 and to the connection points 54 of the set of data links 50. Also advantageously, the number of junction boxes 70 installed on the electrical power distribution and data distribution subnetworks is a function of the density of the electrical equipment items in the fuselage F of the aircraft. For example, in zones of the fuselage where the density of electrical equipment items is moderate, the junction boxes can be installed every four or five pairs of connection points 24, 54, as represented in the bottom part of FIG. 17. In zones of the fuselage where the density of the electrical equipment items is higher, the junction boxes can be installed every two pairs of connection points, even on each pair of connection points, as represented in the top part of FIG. 17.

Also advantageously, the set of data links 50 comprises at least one particular connection point, called cross-connect point 55. This at least one cross-connect point 55 is provided to receive a cross-connect rack 64. The set of data links 50 comprises data links between the cross-connect point 55 and different connection points 54. The cross-connect rack makes it possible to link the data links to one another by means of jumper links.

Figure 20:
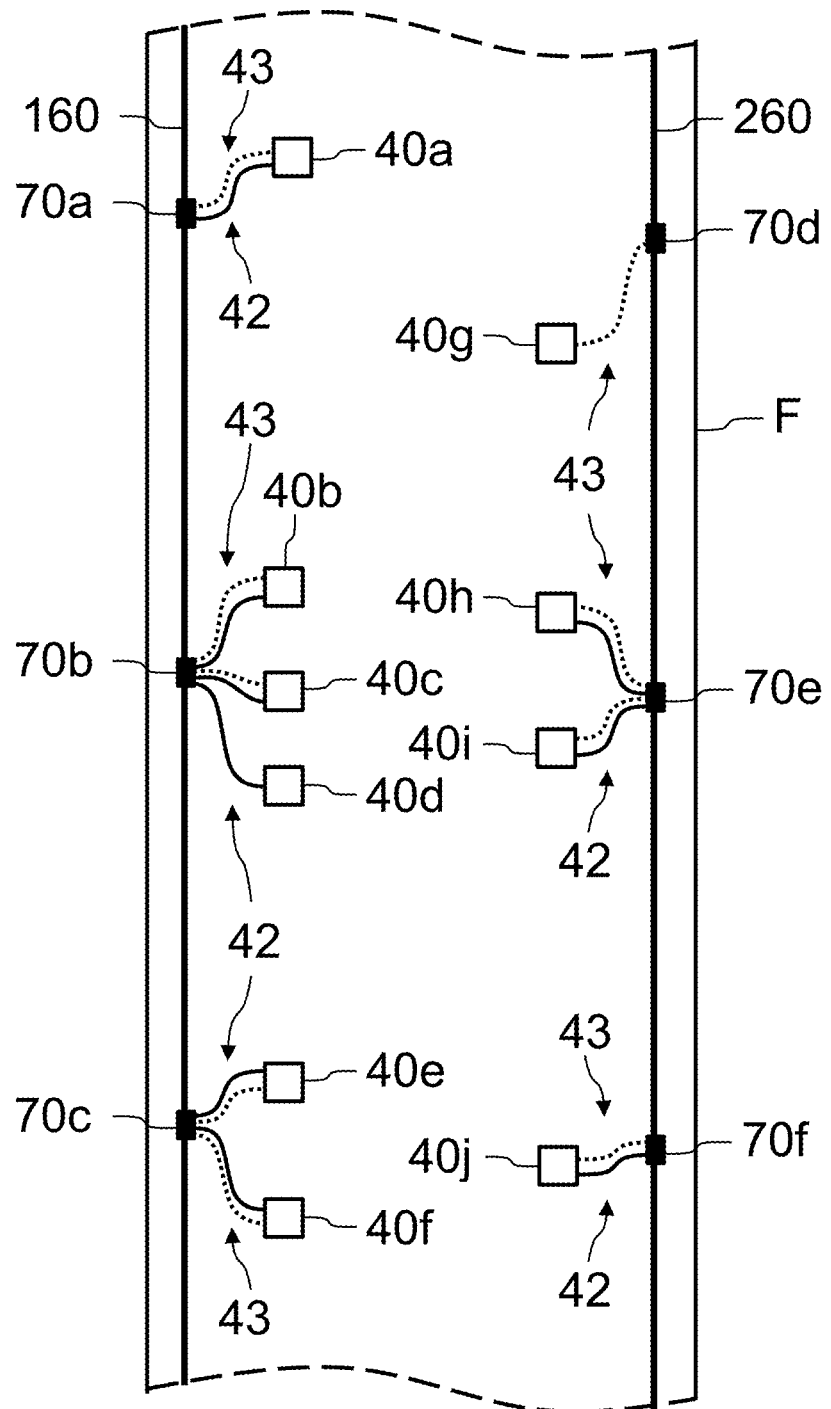
FIG. 20 is a schematic view of a part of the fuselage of the aircraft represented in FIG. 15.

Each of the electrical equipment items of the set of electrical equipment items is linked to a pair of connection points via a local electrical power supply link 42 and/or via a local data link 43, as represented in FIG. 20. The aircraft 1 comprises a set of electrical equipment items 40a . . . 40j in the part of the fuselage F represented in the figure. These electrical equipment items each require an electrical power supply to operate, except the equipment item 40g which is energy-independent. The electrical equipment items, except the equipment item 40d, also each require a data link. Each electrical equipment item is linked to a single pair of connection points, by means of the local links 42 and/or 43, preferably via a junction box 70a . . . 70f. In the fuselage part represented in the figure, the part 160 of the first subnetwork is equipped with three junction boxes 70a, 70b, 70c and the part 260 of the second subnetwork is equipped with three junction boxes 70d, 70e, 70f. The electrical equipment item 40a is linked to the junction box 70a by a local electrical power supply link 42 and by a local data link 43. The electrical equipment items 40b and 40c are linked to the junction box 70b by a local electrical power supply link 42 and by a local data link 43. The electrical equipment item 40d is linked to the junction box 70b only by a local electrical power supply link 42. The electrical equipment items 40e and 40f are linked to the junction box 70c by a local electrical power supply link 42 and by a local data link 43. The electrical equipment item 40g is linked to the junction box 70d only by a local data link 43. The electrical equipment items 40h and 40i are linked to the junction box 70e by a local electrical power supply link 42 and by a local data link 43. The electrical equipment item 40j is linked to the junction box 70f by a local electrical power supply link 42 and by a local data link 43. In a particular exemplary embodiment, the junction boxes 70a, 70b, 70c, on the one hand, and 70d, 70e, 70f, on the other hand, are installed every four or five pairs of connection points, respectively on the part 160 of the first subnetwork and on the part 260 of the second subnetwork. When the pairs of connection points are spaced apart, for example by 50 cm, two consecutive junction boxes are then spaced apart by approximately 2 meters.

Figure 18:
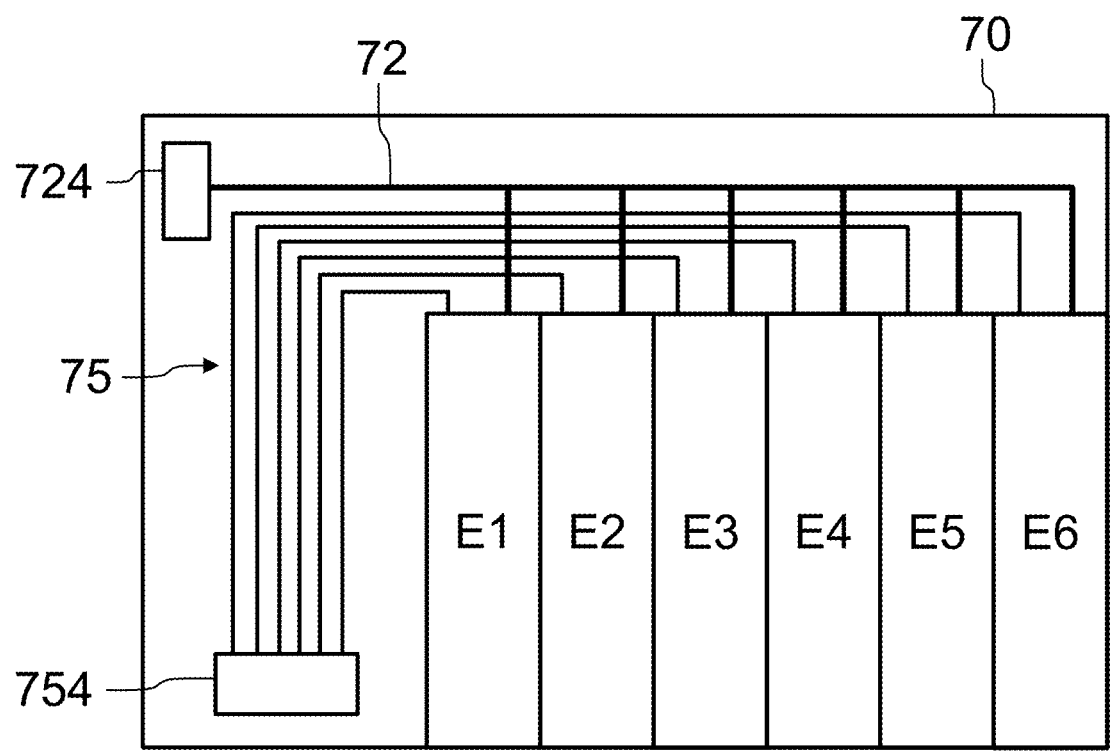
FIGS. 18 and 19 schematically represent two examples of junction boxes according to embodiments of the invention.

In a particular embodiment represented in FIG. 18, a junction box 70 comprises an electrical power supply connector 724, a data link connector 754 and a set of locations E1, E2, . . . E6 provided to each receive an interface module. The electrical power supply connector 724 is provided to cooperate with the connection point 24 of the pair of connection points to which the junction box is connected. The data link connector 754 is provided to cooperate with the connection point 54 of the set of data links belonging to the pair of connection points to which the junction box is connected. This data link connector corresponds, for example, to at least one multi-optical fiber connector when the data links of the distribution network 600 correspond to optical fibers. The junction box 70 also comprises a set of electrical links 72 extending between the electrical power supply connector 724 and the different locations E1, E2, . . . E6 provided to receive the interface modules, and a set of data links 75 extending between the data link connector 754 and the different locations provided to receive the interface modules.

Figure 19:
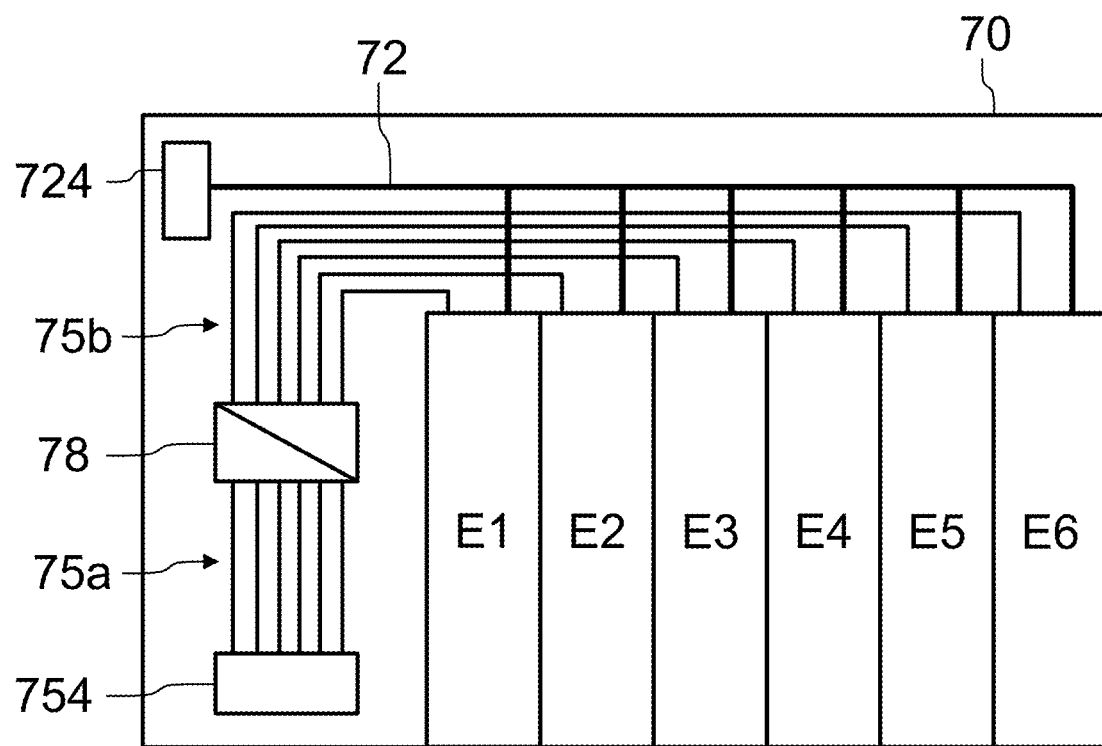

In a variant represented in FIG. 19, the data links of the distribution network 600 correspond to optical fibers and the junction box 70 also comprises a data link converter 78. This converter is provided to convert communications by optical fibers into wired communications and vice-versa. The set of data links 75 then comprises data links by optical fibers 75a between the data link connector 754 and the data link converter 78, and data links 75b using electrical signals between the data link converter 78 and the different locations E1, E2, . . . E6 provided to receive the interface modules. This variant offers the advantage of allowing communications by optical fibers over the set of data links of the hybrid electrical power distribution and data communication network 600. These communications are thus insensitive to electromagnetic disturbances. These communications by optical fibers are transformed into wired communications in the junction box 70, which allows for a wired connection of the data links 75b with the interface modules that can be installed in the locations E1, E2, . . . E6. Such a wired connection exhibits a better reliability than an optical connection in as much as the interface modules are likely to be replaced or moved. Indeed, such a wired connection is less sensitive to dust and to vibrations than an optical connection.

In an exemplary embodiment, the connectors 724 and 754 are arranged on a rear face of the junction box 70. The electrical links 72 and the data links 75 are produced by means of a backplane board of the junction box. These links arrive on connectors of the backplane board, arranged facing locations E1, E2, . . . E6 such that the interface modules likely to be installed in the locations can be plugged into these connectors.

Figure 21A:
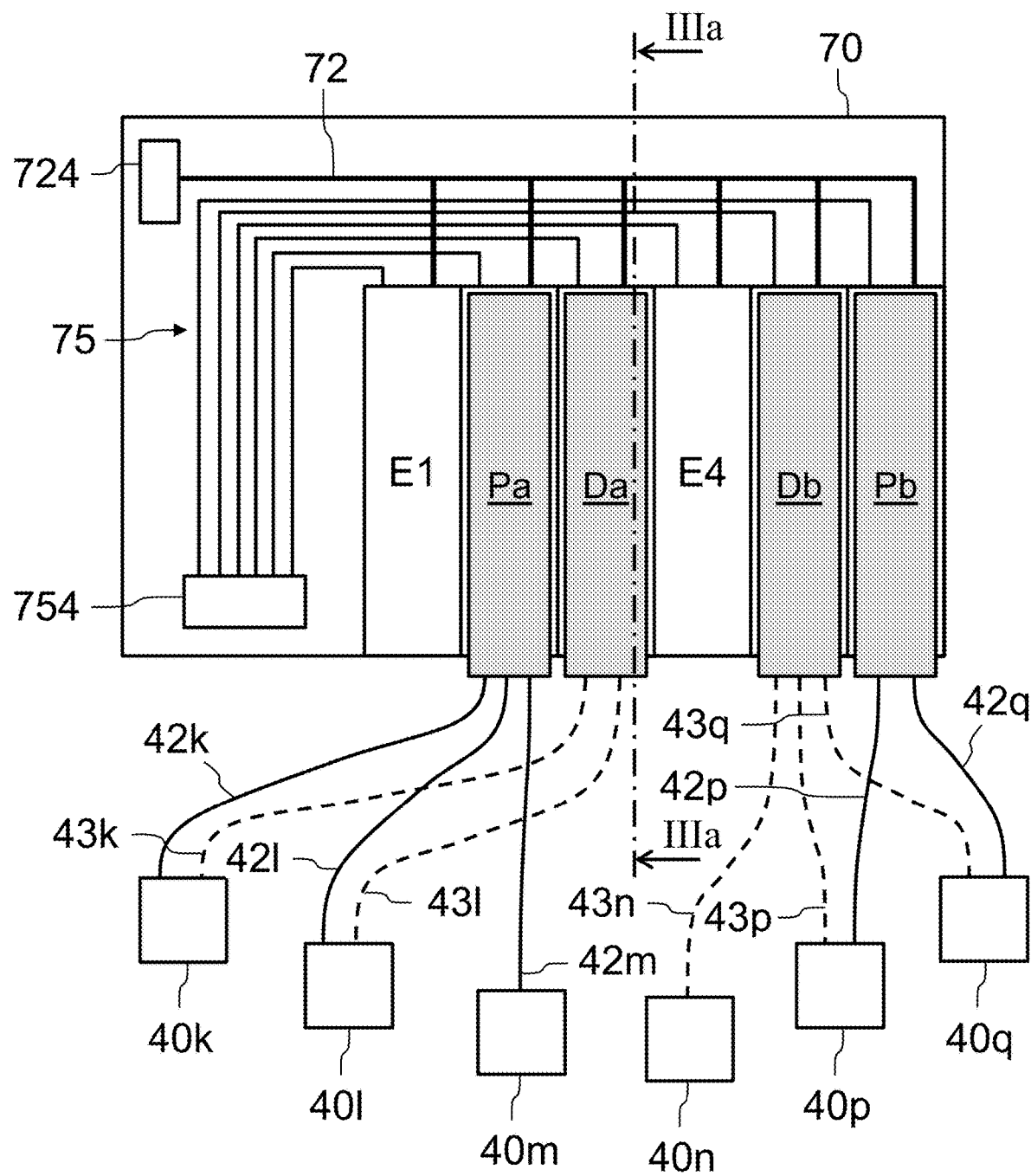
FIGS. 21a and 22 illustrate the connection of electrical equipment items to the junction box, such as those represented in FIG. 18 or FIG. 19.

In a first particular embodiment represented in FIG. 21a, electrical equipment items 40k . . . 40q are connected to electrical interface modules Pa, Pb by local electrical power supply links 42k . . . 42q and/or to data link interface modules Da, Db by local data links 43k . . . 43q. In the examples represented in the figure, the electrical interface modules Pa, Pb are respectively installed in the locations E2, E6 of the junction box 70 and the data link interface modules Da, Db are respectively installed in the locations E3, E5 of the junction box 70. In this first embodiment, an electrical equipment item which requires an electrical power supply and a data link is linked to an electrical interface module by a local electrical power supply link and to a data link interface module by a local data link. For example, the electrical equipment item 40k is linked to the electrical interface module Pa by a local electrical power supply link 42k and to the data link interface module Da by a local data link 43k. Advantageously, the local electrical power supply links 42k . . . 42q and the local data links 43k . . . 43q are terminated by connectors capable of cooperating with connectors of the interface modules. Also advantageously, the rear face of the junction box 70 comprises supports provided to hold the connectors of the local electrical power supply links and of the local data links in position, such that these connectors are connected to the corresponding connectors of the interface modules when the interface modules are installed in their respective locations of the junction box. That advantageously makes it possible to remove and install the interface modules in the locations E1, E2, . . . E6 of the junction box without having to manipulate the connectors of the different data links. That also makes it possible to then avoid errors of connection of the links.

Figure 21B:
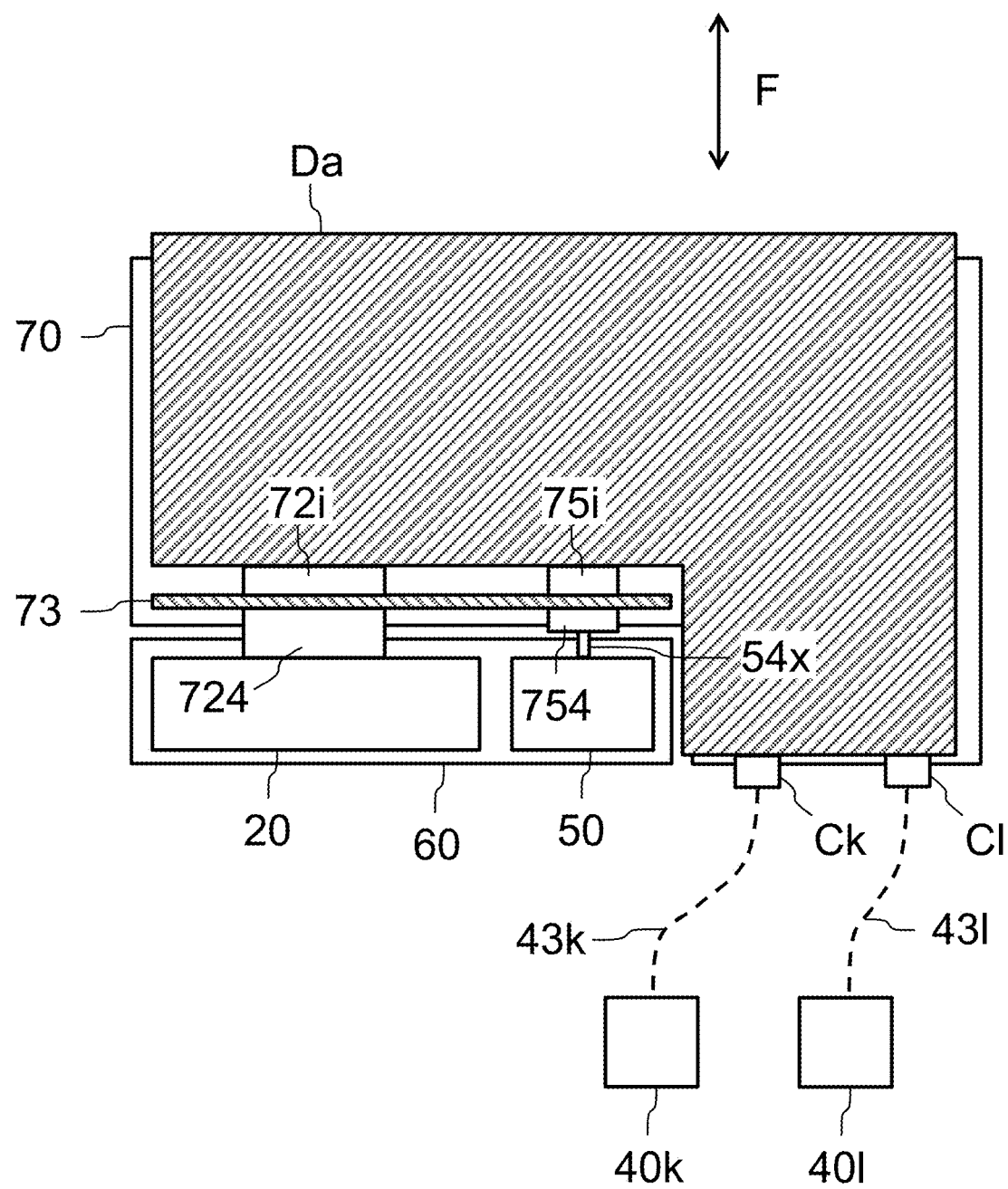

In an example represented in FIG. 21b, the junction box comprises a backplane board 73. The connectors 724 and 754 are secured to the backplane board. These connectors are arranged in such a way that when the junction box is installed on a pair of connection points, as represented in the figure, the electrical power supply connector 724 is linked to the connection point of the bus 20 and the data link connector 754 can receive a connector of an end 54x of data links of the connection point of the set of data links 50. In the figure, the interface module Da is represented inserted into a location of the junction box 70. This interface module is linked to the backplane board 73 by means of an electrical power supply connector 72i and a data link connector 75i. The arrow F represents a direction of extraction (upward in the figure) and of insertion (downward in the figure) of the interface module in the junction box 70. The local data links 43k and 43l to the electrical equipment items 40k and 40l are terminated by respective connectors Ck and Cl linked to the interface module. Advantageously, as indicated previously, the rear face of the junction box 70 (represented at the bottom in the figure) comprises supports, that are not represented, provided to hold the connectors Ck and Cl in position. Although this example is described for the interface module Da, it is in no way limited to this interface module and it can be applied to all the interface modules of the junction box.

Particularly, each electrical interface module is chosen from the following set:
an electrical connection module, making it possible to establish an electrical connection between conductors of the bus, via the electrical links 72 of the junction box, and the connectors provided for local electrical power supply links to electrical equipment items;
an electrical switching module making it possible to control the electrical power supply of an electrical equipment item from a remote system. This electrical switching module comprises a switch placed in series on an electrical connection between conductors of the bus (via the electrical links 72 of the junction box) and a connector provided for a local electrical power supply link to the electrical equipment item. The switching module is linked to the remote system via one of the data links 75. Based on commands received from the remote system, the switching module controls the opening or the closing of the switch so as to control the electrical power supply of the electrical equipment item;
an electrical voltage conversion module which comprises a converter powered from the electrical voltages present on conductors of the bus, via the electrical links 72 of the junction box. This converter corresponds, for example, to a transformer, to a DC-DC voltage converter, to a transformer-rectifier set, etc. At least one output of the converter is linked to a connector provided for a local electrical power supply link to an electrical equipment item; and
an electrical protection module. This electrical protection module comprises a circuit breaker placed in series on an electrical connection between conductors of the bus (via the electrical links 72 of the junction box) and a connector provided for a local electrical power supply link to an electrical equipment item.

Also particularly, each data link interface module is chosen from the following set:
a data link connection module, making it possible to establish at least one connection between a data link of the set of data links 50 associated with the bus 20, via one of the links 75 of the junction box, and a connector provided for a local data link to an electrical equipment item;
a data link converter module. This module comprises a converter linked to a data link of the set of data links 50 associated with the bus 20, via one of the links 75 of the junction box. Moreover, this converter is linked to a connector provided for a local data link to an electrical equipment item. For example, this converter makes it possible to convert an optical data link over the set of data links into a wired data link over the local data link. In another example, this converter makes it possible to convert a data link of Ethernet type over the set of data links into a data link of USB type over the local data link;
a wireless data link module. This module comprises a wireless communication transceiver, linked to a data link of the set of data links 50 associated with the bus 20, via one of the links 75 of the junction box. The local data links between this interface module and electrical equipment items are then of wireless type, for example of WiFi type; and
a data acquisition and concentration module. The electrical equipment items linked to this module by local data links are for example sensors. The module comprises an electronic circuit linked to a data link of the set of data links 50 associated with the bus 20, via one of the links 75 of the junction box. This electronic circuit is provided to acquire data supplied by the sensors to concentrate data originating from different sensors and to transmit these data over the data link of the set of data links.

In particular, the junction box 70 can comprise a hybrid interface module ensuring an electrical interface module function, as mentioned above, and a data link interface module function, as mentioned above. In some circumstances, this hybrid interface module can meet the bulk constraints of locations of the junction box 70.

Figure 22:
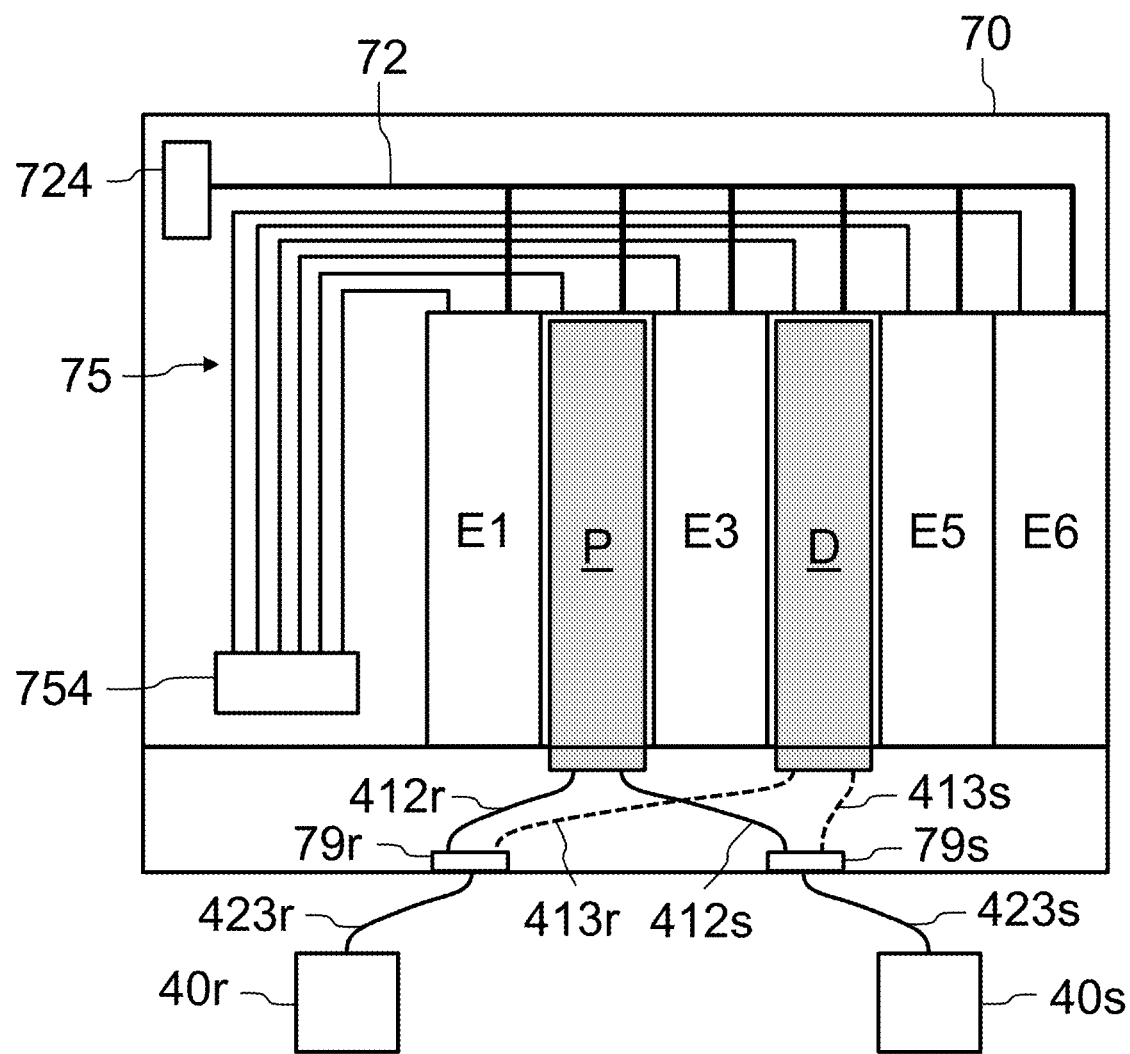

In a second particular embodiment represented in FIG. 22, electrical equipment items 40r, 40s are each connected to a respective connector 79r, 79s of the junction box 70, by respective local links 423r, 423s. These local links are of hybrid electrical power supply and data link type. The connector 79r and the connector 79s of the junction box are each linked to an electrical interface module P and to a data link interface module D, by links internal to the junction box. Thus, the connector 79r is linked to the electrical interface module P by an electrical link 412r and to the data link interface module D by a data link 413r. The connector 79s is linked to the electrical interface module P by an electrical link 412s and to the data link interface module D by a data link 413s. Preferably, the pin-out of the different connectors 79r, 79s of the junction box is similar for all of the connectors. That makes it possible to use identical hybrid local links between the different electrical equipment items and the connectors of the junction boxes to which these electrical equipment items are connected. The result thereof is a simplification of the connections of the electrical equipment items by means of the hybrid local links. Although this second particular embodiment is described with two electrical equipment items and two interface modules, it is in no way limited to these numbers of electrical equipment items and of interface modules. Advantageously, as for the local links of the electrical equipment items of the first particular embodiment, the internal links 412r, 412s, 413r, 413s are terminated by connectors capable of cooperating with connectors of the interface modules P and D. The rear face of the junction box 70 comprises supports provided to hold the connectors of the internal links in position, such that these connectors are connected to the corresponding connectors of the interface modules when the interface modules are installed in their respective locations of the junction box. That advantageously makes it possible to remove and install the interface modules in the locations E1, E2, . . . E6 of the junction box without having to manipulate the connectors of the different internal links. That also makes it possible to then avoid errors of connection of the links.

Figure 23:
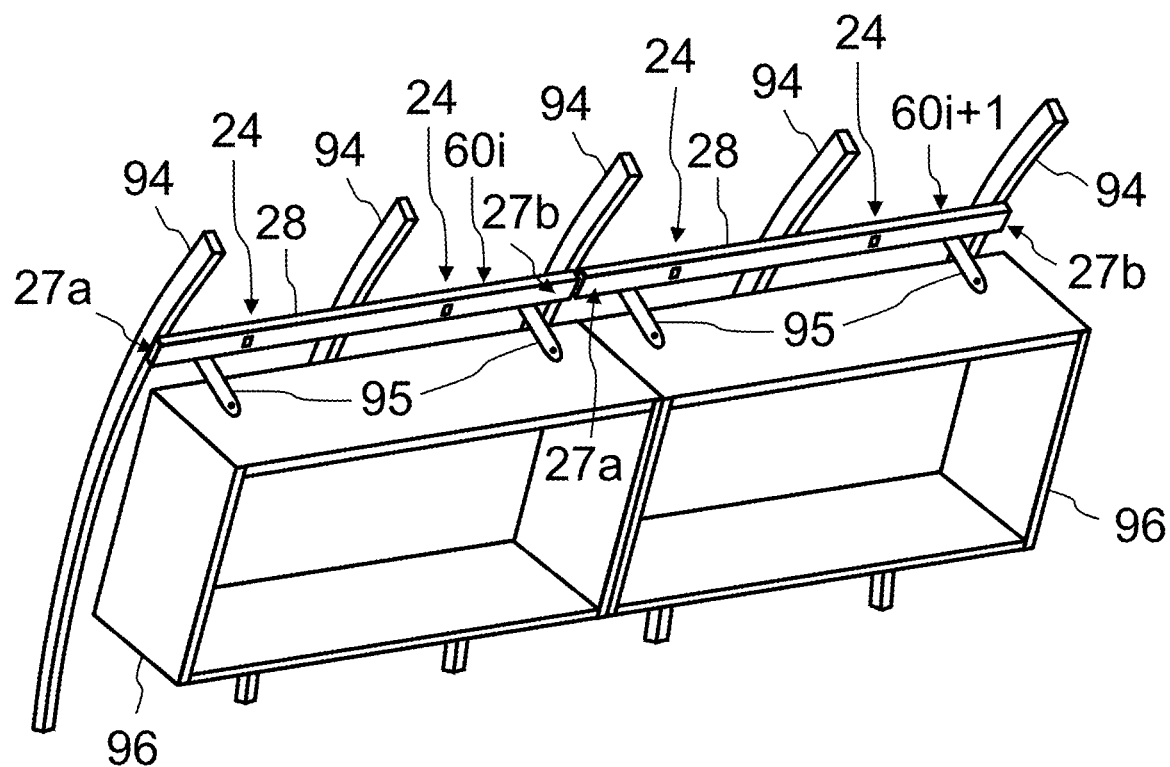
FIG. 23 represents an example of a bus section, a structural enclosure of which supports at least one baggage compartment of an aircraft.

According to an embodiment in accordance with the fourth aspect of the invention and illustrated by FIG. 23, modular elements 60i, 60i+1 for an electrical power distribution network of an aircraft, each comprise an enclosure 28. Each modular element comprises a section of a bus whose electrical conductors, not represented in the figure, are housed in the enclosure 28. The bus section extends along the length of the modular element concerned. The bus section of a modular element 60i, 60i+1 comprises a first interconnection point 27a at a first longitudinal end and a second interconnection point 27b at a second longitudinal end. The first and second interconnection points 27a and 27b are provided to link the bus section to a bus section of another modular element arranged longitudinally in series with the modular element concerned. Thus, in the example represented in the figure, the second interconnection point 27b of the modular element 60i is linked to the first interconnection point 27a of the modular element 60i+1. Advantageously, the link between the buses of two consecutive modular elements corresponds to a connection making it possible to absorb longitudinal deformations of the aircraft. This connection is, for example, produced by means of a connector provided to allow a sliding of conductor elements participating in the connection. The enclosure 28 corresponds to a structural part of the aircraft, in this case a part provided to support baggage compartments 96 in the cabin of the aircraft. This part is, for example, a metal part or a part made of composite material whose thickness is chosen to support the weight of the baggage compartments. When the part is metal, made of aluminum, it comprises, for example, one face 5 mm thick and other faces 2 mm thick. The enclosure 28 corresponding to each modular element 60i, 60i+1 is fixed by fixing means not represented in the figure, to a set of structural frames 94 of the aircraft. The enclosures 28 of the different modular elements support the baggage compartments 96 by virtue of fixings 95. Although not mandatory, these fixings 95 can be mounted to slide on the enclosures 28 of the modular elements so as to allow a sliding of the baggage compartments along the length of the fuselage of the aircraft. In the example represented in the figure, the length of the enclosure 28 corresponding to each modular element extends along two interframe spaces of the fuselage of the aircraft. The term interframe space here denotes the space between two consecutive structural frames of the fuselage. Without departing from the scope of the invention, the length of the enclosure 28 could also extend along a single interframe space or along a higher number of interframe spaces. The bus section of a modular element comprises connection points 24 at different locations distributed along its length. An opening of the enclosure 28 is provided facing each connection point 24 so as to allow the connection of at least one electrical equipment item of the aircraft to the bus section by means of a local electrical link. In the example represented in the figure, the connection points are distributed over the bus section corresponding to each modular element so as to have a connection point 24 for each interframe space of the fuselage of the aircraft. Other arrangements are possible without departing from the scope of the invention, for example one connection point for two interframe spaces of the fuselage.

The modular elements 60i, 60i+1 form part of an electrical power distribution network of the aircraft, for example an electrical power distribution network similar to the networks 200 or 600 already described with reference to the first and second aspects of the invention. In an advantageous embodiment, each modular element also comprises a set of data links, like the modular elements described with reference to the second aspect of the invention. Consequently, this advantageous embodiment is not described further, all the embodiments described with reference to the second aspect of the invention also being applicable.

Figure 24:
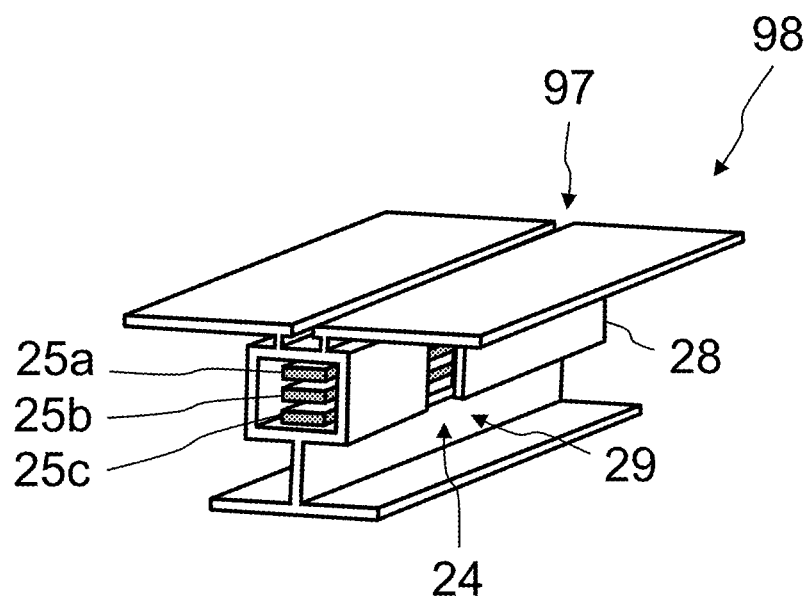
FIG. 24 represents an example of bus section, of which a structural enclosure corresponds to a seat rail of an aircraft.

In another embodiment illustrated by FIG. 24, the enclosure 28 of a bus section of a modular element forms part of a floor rail section 98 of an aircraft. To this end, it corresponds to a structural part of the aircraft. The floor rail can correspond to a floor rail not provided for fixing seats or even to a seat rail provided for fixing seats in the passenger cabin of the aircraft. For reasons of legibility, only a part of the length of the floor rail section 98 is represented in the figure. From an electrical point of view, each modular element is similar to the modular elements 60i, 60i+1 described with reference to FIG. 23. Thus, these modular elements can be arranged in series and linked to one another by interconnection points 27a, 27b. With each modular element corresponding to a floor rail section of the aircraft, the series placement of floor rail sections in the cabin of the fuselage of the aircraft, to produce a floor rail, makes it possible to construct an electrical power distribution network of the aircraft. In the exemplary embodiment represented in the figure, three conductor elements 25a, 25b, 25c of the bus section are housed in the enclosure 28. This example is not, however, limiting on the number of conductors that the bus can comprise. Preferably, the conductor elements are arranged horizontally inside the enclosure 28, so as to allow the production of connection points 24 on a lateral face of the floor rail section 98. The term horizontal here means that the conductor elements are arranged horizontally when the floor rail section is installed on a floor of the cabin of the fuselage of the aircraft, the aircraft being parked on the ground. An opening 29 of the enclosure 28 is provided facing each connection point 24 so as to allow the connection of at least one electrical equipment item of the aircraft to the bus section by means of a local electrical link. Conventionally, when the floor rail is a seat rail, the top part of the seat rail comprises a groove 97 allowing the fixing of seats.

The different embodiments, examples, variants and alternatives described in relation to the various aspects of the invention can be combined with one another without departing from the scope of the invention. For example, in a nonlimiting manner, the electrical power distribution network 200 of an aircraft in accordance with the first aspect of the invention can be produced by assembling modular elements 60 conforming to the second aspect of the invention. Similarly, the hybrid electrical power distribution and data communication network 600 in accordance with the third aspect of the invention can be produced by assembling modular elements in accordance with the second aspect of the invention. Also for example, the junction boxes 68 described in relation to the second aspect of the invention can be similar to the junction boxes 70 described in more detail in relation to the third aspect of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A modular element for an electrical power distribution network of an aircraft, comprising:
  a section of an electrical power distribution bus, extending along a length of the modular element,
    the bus section comprising connection points at different locations distributed along a length of the bus section;
    the bus section comprising a first interconnection point provided to link the bus section to a bus section of a first other modular element arranged longitudinally in series with the modular element, at a first longitudinal end of the modular element;
    the bus section comprising a second interconnection point provided to link the bus section to a bus section of a second other modular element arranged longitudinally in series with the modular element, at a second longitudinal end of the modular element opposite the first longitudinal end;
    the bus section comprising a set of electrical conductors, these electrical conductors of the bus section are housed in an enclosure corresponding to a structural part of the aircraft; and
    said enclosure comprising openings facing the connection points of the bus section, so as to allow connection of at least one electrical equipment item of the aircraft to the bus section by means of a local electrical link;
  wherein the modular element is provided for a hybrid electrical power distribution and data communication network of an aircraft,
  comprising a set of data links, said set of data links extending along a length of the modular element, substantially parallel to the bus section, and wherein:
    the set of data links comprises connection points at different locations distributed along its length and each arranged in proximity to a connection point of the bus section;
    the set of data links comprises a connection point, called cross-connect point, provided to receive a cross-connect rack;
    the set of data links comprises at least one data link between each of the connection points distributed along its length and the cross-connect point;
    the set of data links comprises a first interconnection point provided to link the set of data links to a set of data links of a first other modular element arranged longitudinally in series with the modular element, at a first longitudinal end of the modular element; and
    the set of data links comprises a second interconnection point provided to link the set of data links to a set of data links of a second other modular element arranged longitudinally in series with the modular element, at a second longitudinal end of the modular element opposite the first longitudinal end.

2. The modular element according to claim 1, wherein said structural part of the aircraft is provided to cooperate with a fixing of at least one baggage compartment of the aircraft to support the baggage compartment.

3. The modular element according to claim 1, wherein said structural part of the aircraft corresponds to a floor rail section of the aircraft.

4. The modular element according to claim 1, wherein at least one of the first and second interconnection points comprises a connector provided to slidingly absorb relative movements between the modular element and the first or the second other modular element.

5. An aircraft, comprising:
  a fuselage,
  a set of electrical equipment items distributed in the fuselage, and
  an electrical power distribution network comprising a set of modular elements according to claim 1,
    wherein each of the electrical equipment items of the set of electrical equipment items is linked to a connection point of the bus section of a modular element via a local electrical power supply link, wherein the modular element is provided for a hybrid electrical power distribution and data communication network of an aircraft, comprising a set of data links, said set of data links extending along a length of the modular element, substantially parallel to the bus section, and wherein:
    the set of data links comprises connection points at different locations distributed along its length and each arranged in proximity to a connection point of the bus section;
    the set of data links comprises a connection point, called cross-connect point, provided to receive a cross-connect rack;
    the set of data links comprises at least one data link between each of the connection points distributed along its length and the cross-connect point;
    the set of data links comprises a first interconnection point provided to link the set of data links to a set of data links of a first other modular element arranged longitudinally in series with the modular element, at a first longitudinal end of the modular element; and
    the set of data links comprises a second interconnection point provided to link the set of data links to a set of data links of a second other modular element arranged longitudinally in series with the modular element, at a second longitudinal end of the modular element opposite the first longitudinal end.

6. The aircraft according to claim 5, wherein:
  modular elements of a first subset of the set of modular elements are assembled together so as to form a first electrical power distribution subnetwork extending, at least partly, longitudinally in the fuselage of the aircraft;

modular elements of a second subset of the set of modular elements are assembled together so as to form a second electrical power distribution subnetwork extending, at least partly, longitudinally in the fuselage of the aircraft; and the first subnetwork and the second subnetwork follow segregated paths in the fuselage.

7. The aircraft according to claim 5, wherein two consecutive modular elements are linked to one another electrically by means of at least one connection element configured to slide over the section of the bus of at least one of the two modular elements.

8. The aircraft according to claim 5, wherein said structural part of the aircraft is provided to cooperate with a fixing of at least one baggage compartment of the aircraft to support the baggage compartment, further comprising a set of baggage compartments fixed to modular elements of the set of modular elements.

9. The aircraft according to claim 5, wherein said structural part of the aircraft corresponds to a floor rail section of the aircraft, of which at least a part of the floor rail section is formed by a set of modular elements.

* * * * *